(12) United States Patent
Kundu et al.

(10) Patent No.: US 7,516,888 B1
(45) Date of Patent: Apr. 14, 2009

(54) METHOD AND APPARATUS FOR AUDITING TRANSACTION ACTIVITY IN RETAIL AND OTHER ENVIRONMENTS USING VISUAL RECOGNITION

(75) Inventors: Malay Kundu, Lexington, MA (US); Vikram Srinivasan, Louisville, KY (US)

(73) Assignee: Stoplift, Inc., Bedford, MA (US)

( * ) Notice: Subject to any disclaimer, the term of this patent is extended or adjusted under 35 U.S.C. 154(b) by 208 days.

(21) Appl. No.: 11/157,127

(22) Filed: Jun. 20, 2005

Related U.S. Application Data

(60) Provisional application No. 60/666,081, filed on Mar. 29, 2005, provisional application No. 60/627,862, filed on Nov. 15, 2004, provisional application No. 60/581,559, filed on Jun. 21, 2004.

(51) Int. Cl.
*G06K 15/00* (2006.01)
*G06F 17/00* (2006.01)
*G06F 7/08* (2006.01)

(52) U.S. Cl. .................... 235/383; 235/375; 235/381

(58) Field of Classification Search ............. 235/375, 235/383, 385, 381; 705/22–24
See application file for complete search history.

(56) References Cited

U.S. PATENT DOCUMENTS

| | | | | |
|---|---|---|---|---|
| 5,745,036 A | * | 4/1998 | Clare | 340/572.1 |
| 5,965,861 A | * | 10/1999 | Addy et al. | 235/383 |
| 7,049,965 B2 | * | 5/2006 | Kelliher et al. | 340/572.4 |
| 7,080,778 B1 | * | 7/2006 | Kressin et al. | 235/385 |

\* cited by examiner

*Primary Examiner*—Karl D Frech
*Assistant Examiner*—April A Taylor
(74) *Attorney, Agent, or Firm*—Chapin IP Law, LLC; Barry W. Chapin, Esq.

(57) ABSTRACT

A system detects a transaction outcome by obtaining video data associated with a transaction area and by obtaining transaction data concerning at least one transaction that occurs at the transaction area. The system correlates the video data associated with the transaction area to the transaction data to identify specific video data captured during occurrence of that at least one transaction at the transaction area. Based a transaction classification indicated by the transaction data, the system processes the video data to identify appropriate visual indicators within the video data that correspond to the transaction classification.

37 Claims, 26 Drawing Sheets

Fig. 1 - Overall Process

Fig 5 - Batch Process based on Trans Class

Fig 7 - Generic & Detailed Criteria Examples

EXAMPLES OF GENERIC CRITERIA

Refund Transaction (or Negative Balance Exchange) Criteria for Suspicion:
No Customer Present OR No Merchandise Present Void Transaction Criteria for Suspicion:
Transaction not re-rung AND Customer Leaves with Item Regular Sales Transaction:
Visual Number of Items > Official Number of Items (according to Transaction Details)

No-Sale:
Cash Drawer Open AND No Customer Present

Vendor Delivery Criteria for Suspicion:
(No Vendor Present OR No Merchandise Present)

NEED TO ADD OTHER NEWER CRITERIA AS WELL...

EXAMPLES OF DETAILED CRITERIA

Refund Transaction Criteria for Suspicion:
1/5/04 on Register 5 from 12:03:15 to 12:05:45
(No Customer Present OR No Merchandise Present)

Exchange with Negative Net Balance ($-11.59):
1/5/04 on Register 7 from 12:25:15 to 12:27:15
(No Customer Present OR No Item Present)

Void Transaction
1/5/04 on Register 6 from 13:05:30 to 13:06:15
Transaction 1006 is not re-rung and Customer Leaves with item Regular Sales Transaction:
1/5/04 on Register 4 from 13:05:30 to 13:06:15
Visual Number of Items > 3 items officially No-Sale:
1/5/04 on Register 3 from 14:10:00 to 13:11:00
Cash Drawer Open AND No Customer Present Vendor Delivery:
1/5/04 on Register 200 from 20:15:25 to 20:17:25
(No Vendor Present OR No Merchandise Present)

Fig 8 - Refund Transaction (or Negative-Balance Exchange) Audit Process / Criteria

Fig 9 - Sales Transaction Audit Process / Criteria for Pass-Through Detection

Fig 10 - Voided Transaction Audit / Assessment Criteria

Fig 11 - Vendor Delivery Audit / Assessment Criteria

Fig 12 - Detect Customer Presence

Fig 13 - Detect Vendor Presence

Or look for TWO people

Fig 14 - Detect Merchandise Presence

Fig 15b - Detect Object Presence (Motion-based Alternative)

One skilled in the art, will immediately recognize that there a multiple ways of doing this

Fig 16 - Analysis by Time-Lapse Imaging

Fig 17 - Time-Composite Image Creation

Maybe have a separate slide for time lapse images?

Fig 18 - Counting Objects (Human Operator)

In one quick glance, a human viewer can easily determine whether or not a customer was present during the duration of a refund transaction.

Tiled Time-Composite Image

Multiple Frames in Tiled Time-Composite Image allow operator to see two items involved in what should be a one-item transaction.

High Counter Occlusion Image

Counter Area    Items

High Counter Occlusion Base Image

High Counter Occlusion Object map Image

METHOD AND APPARATUS FOR AUDITING TRANSACTION ACTIVITY IN RETAIL AND OTHER ENVIRONMENTS USING VISUAL RECOGNITION

CROSS-REFERENCE TO RELATED APPLICATIONS

This Utility patent application claims the benefit of the filing date of the following three (3) earlier filed and U.S. Provisional patent applications:

1: "METHOD AND APPARATUS FOR AUDITING TRANSACTION ACTIVITY IN RETAIL AND OTHER ENVIRONMENTS USING VISUAL RECOGNITION" filed Jun. 21, 2004 having U.S. Ser. No. 60/581,559;

2: "METHOD AND APPARATUS FOR DIGITAL ARCHIVING OF VIDEO" filed Nov. 15, 2004 having U.S. Ser. No. 60/627,862;

3: "METHOD AND APPARATUS FOR DETECTING ITEM PASS THROUGH & MISIDENTIFICATION" filed Mar. 29, 2005 having U.S. Ser. No. 60/666,081.

The content and teachings of the above three provisional applications are hereby incorporated by reference in their entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The primary conventional method used for auditing transactional activity and detecting transactional fraud in retail loss prevention today is data mining of POS data (as typified by U.S. Pat. No. 5,895,453, the contents of which is hereby incorporated by reference), also referred to as "exception reporting". In retail environments, this method relies on post-analysis of POS transaction data to identify trends and anomalies including those that may highlight fraudulent activity.

Other conventional systems include human monitoring systems and video monitoring systems that involve the use of loss prevention personnel overseeing a real-time video feed (or pre-recorded) to identify fraudulent transactions. This is most often done for sporadic spot checks basis or for investigations to find evidence to confirm or deny inferences from exception reporting.

BRIEF SUMMARY OF THE INVENTION

Conventional mechanisms and techniques for auditing transaction activity in retail and other environments suffer from a variety of deficiencies. Generally, such conventional visual monitoring systems operated by humans are inefficient. While the above conventional video monitoring methods are sufficient for general security applications, embodiments of the invention are superior for detecting transactional fraud because embodiments of the invention incorporate data-awareness necessary to visually audit transactions for individual transaction-specific indicators of fraud.

While conventional exception reporting systems have helped to identify fraudulent activity, retailers admit that it does not catch theft until the dishonest employee "gets greedy". Said another way, because exception reporting usually depends on the frequency and dollar amounts of fraud-prone transactions accumulating over time above given thresholds, dishonest employees are able to keep stealing as long as they "stay under the radar" of these thresholds. Retailers report that the average dishonest employee continues stealing for 6 to 12 months before being caught.

Generally, embodiments of the invention provide a system, methods and apparatus to receive input in the form of a video stream or video image, still picture, moving picture or the like that shows a particular transaction area. In addition, transaction data is provided to the system of the invention from a device such as a cash register, online point-of-sale (POS) terminal or similar device. Likewise the data may be provided from a transaction log of POS transactions, report of transaction activity from an exception reporting system, or other similar information source. The system correlates the video data of the transaction area with the transaction data and compares the video occurring at the time of the transaction to visual indicators suggested by the transaction data. This can be done by processing the correlated video data by look for things in a known region of the video, such as a customer, or a product. If the transaction video captured at the time of the transaction does not correlate or substantially match the acceptable transaction indicators, the system of the invention indicates a fraudulent transaction. Other uses of the system include auditing for purposes of tracking which items are purchased in a store, for example.

Our current method of operation does NOT have an acceptable transaction image to which the correlated video data gets compared. Instead, we are looking for certain things that we would expect to be there (such as a customer present during a refund) for a legitimate transaction.

One characteristic of embodiments of the invention is that embodiments of the invention can be performed efficiently and cost-effectively even if the visual recognition is performed by a human. This is because embodiments of the invention use quickly recognizable visual indicators, such as customer or merchandise presence. Furthermore, the implementations of embodiments of the invention that incorporate human viewing, focus on reducing video data to an instantly understandable individual image (or set of images), even though the video taken at the time of the transaction may have been significantly longer (several seconds or minutes). In cases where more continuous video must be viewed (such as for human counting of items involved in a transaction), the video data may instead be played at faster speeds to reduce time required for the entire recognition task.

As used herein, a "transaction" is generally defined as any activity that has data associated with an observable physical action. For example, an ATM withdrawal, a purchase at a store, a return of an item in a store customer service desk, and the like.

Some example objects of embodiments of the invention are:

To detect fraud by comparing transactional data describing what should have happened with video of what actually happened during the transaction.

To make possible efficient and effective standardized visual recognition of illegitimate or fraudulent activity by characterizing the tell-tale signs of different forms of fraud into general standardized criteria to look for.

To bring efficiency by reducing complexity of visual recognition problem by using a data-driven approach to constrain the visual recognition task on a transaction-specific basis, as opposed to a completely generalized approach To detect fraud or illegitimate activity early based on immediate visual evidence (visual discrepancies when video is compared with data) rather than waiting for a trend to emerge from data alone To break the recognition process down to create a visual recognition system where computer and human recognition may be interchanged based on which is more effective to the particular recognition task.

Make human visual monitoring efficient & cost effective

Embodiments of the invention can be applied to anything that can take advantage of visual auditing of transactions—Fraud/Loss Prevention, Operations, Merchandising, etc. The method and system of the invention use a unique combination of data awareness and visual awareness to identify fraud by visually confirming (by visual detection of transaction-specific indicators as determined by the data) if what is actually happening in the video matches what is supposed to be happening according to the data.

In contrast to conventional systems, the system of the invention provides a visual method that is superior to conventional POS exception reporting because the system of the invention can detect theft on the basis of even only one fraudulent transaction. Because the system of the invention individually examines a video of each and every transaction for visual indicators of fraud, it can detect fraudulent activity right away both in real-time and prerecorded situations.

A summary of a few examples of embodiments of the invention are as follows:

Knowing that data for a particular transaction indicates a merchandise refund transaction, embodiments of the invention can right away determine that the transaction is most likely fraudulent on the basis that there is no customer or no merchandise present at the time of the refund. The dishonest employee in such a case could simply refund the money to cash which he could pocket or to a magnetic strip stored value card containing store credit which he could sell on an online auction web site such as eBay. Exception reporting would not have caught such an individual incident, nor would exception reporting have even highlighted the dishonest employee until and unless his overall refund percentage became abnormally high.

Knowing that data for a particular transaction indicates the sale of X number of items, embodiments of the invention can right away determine that the transaction is most likely fraudulent on the basis that there are more than X number of items actually involved in the transaction. The dishonest employee in such a case could be given extra merchandise free of charge to a friend by simply bagging items without scanning or entering them into the register. Conventional exception reporting would not have caught such an individual incident, nor would exception reporting have even highlighted the dishonest employee until and unless his inter-scan times (the time between successive scans, which is usually not recorded except for in grocery stores where it is highly variable anyway due to price lookups and weighing produce) were frequently significantly longer than the average.

Knowing that data for a particular transaction indicates a voided transaction (that has not been re-rung), embodiments of the invention can right away determine that the transaction is most likely fraudulent on the basis that the customer left the register with merchandise. The dishonest employee in such a case could simply void the transaction and then pocket the cash and/or stored value card used in such a transaction after the customer has left the register. Exception reporting would not have caught such an individual incident, nor would exception reporting have even highlighted the dishonest employee until and unless his overall void percentage became abnormally high.

Mention Other example uses of the system include detection of Cash theft, Vendor Fraud. Ticket-Switching, and customer Identity-Switching (such as for airline passengers).

It should also be noted that, while some conventional exception reporting systems do incorporate a "link" that allows the user to view the digital video clip associated with a particular transaction, the conventional exception reporting systems do not actually perform any analysis or other processing on the video clips themselves, nor do such conventional systems use transaction data in concurrence with video data in the process of identifying fraudulent transactions.

It should be noted that embodiments of the invention can be applied more generally to any kind of visual auditing situation where data can be visually confirmed and compared with what actually happened. This includes operational auditing, etc.

As used herein, "transaction class" is a class that can be based on one or a combination of transaction type, tender, employee discount, refund codes, etc.

Embodiments of the invention provide a method for visually auditing transactions by using "data awareness" of the details of those transactions to create different visually assessable criteria specific to each and every transaction. These criteria are then assessed through visual recognition upon the relevant video clips and then reported upon to produce inspection reports.

While embodiments of the invention have applicability in numerous settings, examples used herein specifically discuss applications of this method to the retail arena. Specifically, methods are described by which this method can be used to detect refund fraud, void fraud, different types of sweethearting, etc.

The term "Transaction" is generally understood to include an activity that has data associated with an observable action. For example, an ATM withdrawal, a purchase at a store, a return of a product at a customer service desk and the like.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 15b is a flowchart of motion-based alternative detect object presence processing steps performed by the invention according to embodiments herein.

DETAILED DESCRIPTION OF THE INVENTION

Slide 1

Figure 1:
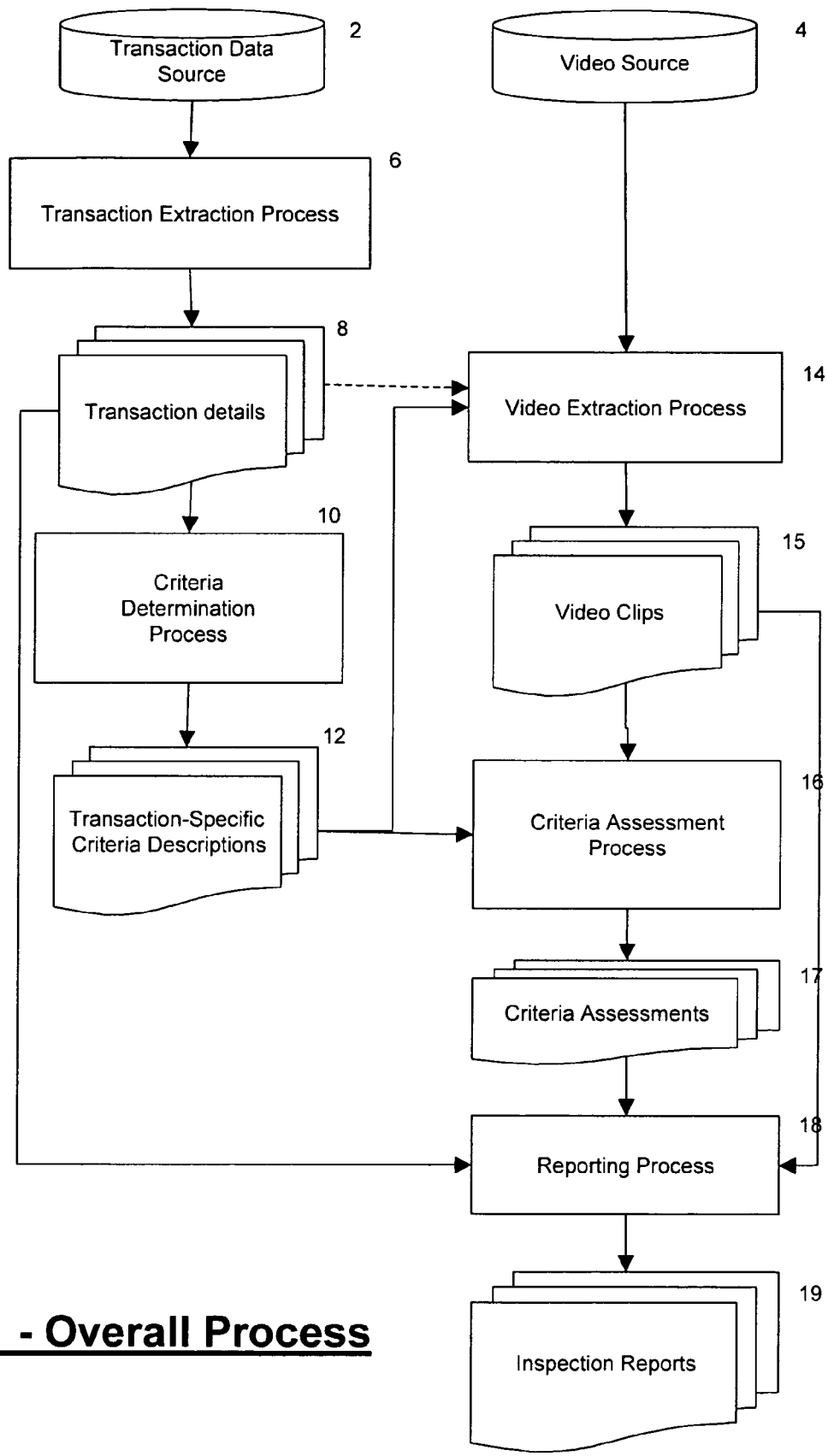
FIG. 1 is a flowchart of processing steps performed by the invention according to embodiments herein.

Overall Process of FIG. 1

Note: "Transaction" is being defined as any activity that has data associated with an observable physical action. As used herein, the phrase "My Method" or similar phrases refers to embodiments of the invention that include methods, apparatus and systems.

My method begins with the transaction data extraction process (6) which extracts the individual transaction details (8) from the transaction data source (2) for a set of one or more transactions of interest.

The set of transaction details (8) are then used by the criteria determination process (10) to create the corresponding set of customized transaction-specific criteria descriptions (12) for each transaction of interest.

The transaction-specific criteria descriptions (12) incorporate a list of visual criteria and constraints such as camera number, location within the image, and the time ranges within the video during which the criteria are to be assessed.

The video extraction process (14) then produces a set of video clips (15) by extracting from the video source (4) the corresponding segments of video for the time ranges specified in the transaction-specific criteria descriptions (12).

Alternatively, the transaction details (8) may be used to drive the video extraction process (12) in a standardized way, i.e., extracting the same fixed duration of video or fixed set of frames relative to the specific time at which the transaction is to occur on video as per the transaction details.

The criteria assessment process (16) then examines the set of video clips (15) to assess the transaction-specific criteria (12) so as to determine the criteria assessments (17). The criteria assessments (17) may take a variety of forms, e.g., from being as simple as a single binary flag to more complex such as a multidimensional numeric score.

The reporting process (18) then takes the criteria assessments (17) and corresponding transaction details (8) and video clips (15) to produce inspection reports (19) which detail the findings of the audit process for the end-user. With access to the video clips and transaction details, the reporting process can produce very informative, easily understandable reports with the inclusion of relevant video images or clips and transaction details.

Slide 2

One Embodiment

Figure 2:
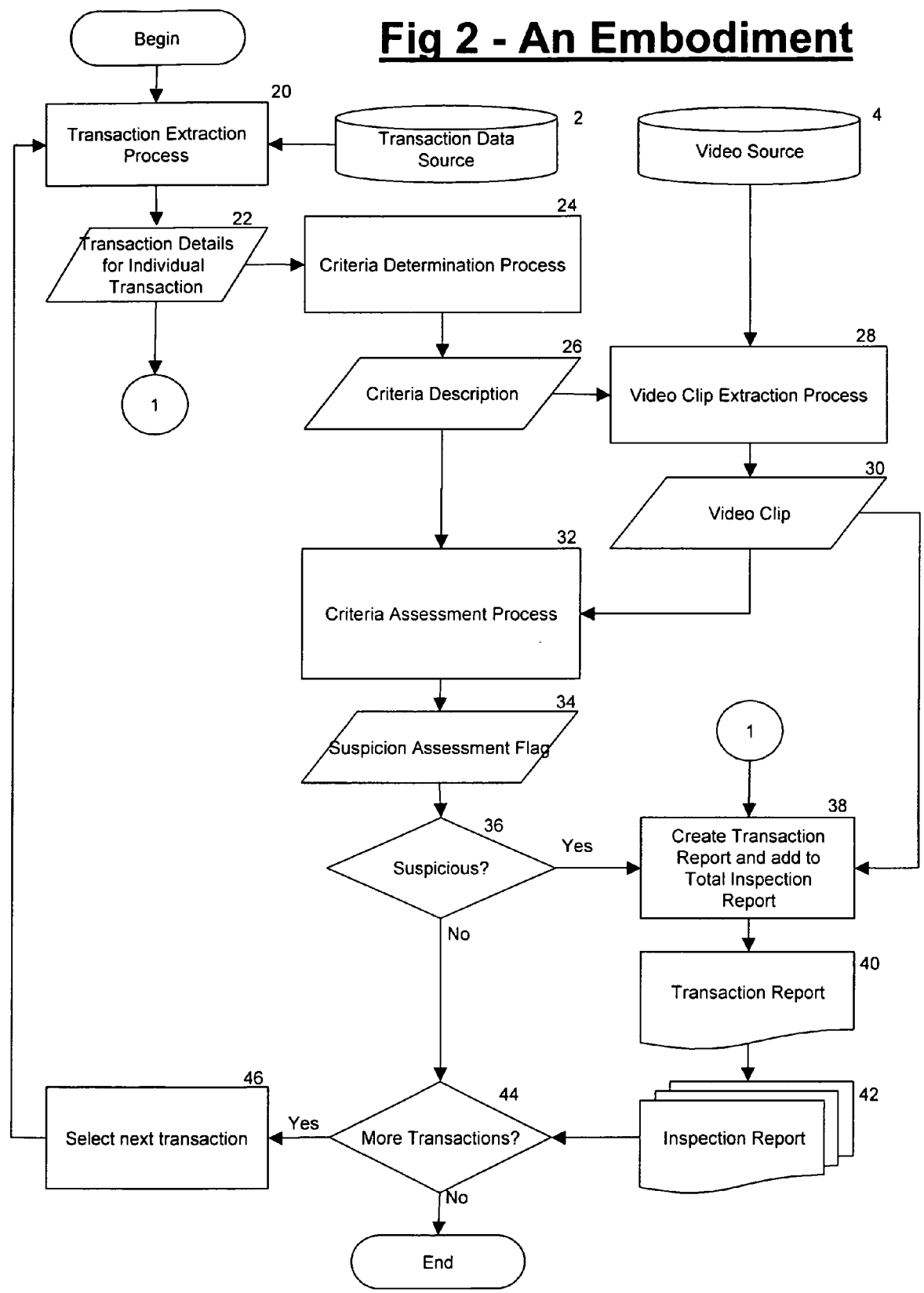
FIG. 2 is a flowchart of processing steps performed by the invention according to embodiments herein.

The Embodiment in FIG. 2 shows the process auditing one transaction at a time for fraudulent activity, such as might be found in a retail environment. Such an embodiment could be used to process individual transactions as they occur in real-time or as they are stepped through as part of batch process.

The process begins with the transaction data extraction process (20) which extracts the transaction details (22) for an individual transaction from the transaction data source (2). The transaction data source (2) may provide real-time or delayed transaction data for one or many transactions. Possible forms of transaction data sources include a non-real-time transaction-log from a data warehouse or a real-time POS polling process within a retail store. The transaction details (22) may be comprised of transaction-level information such information as store, time, date, register, tender type, etc., as well as item-level information such as individual item SKU's, prices, quantities, etc.

The transaction details (22) of the individual transaction are then used by the criteria determination process (24) to create the criteria description (26) for that specific transaction.

Figure 6:
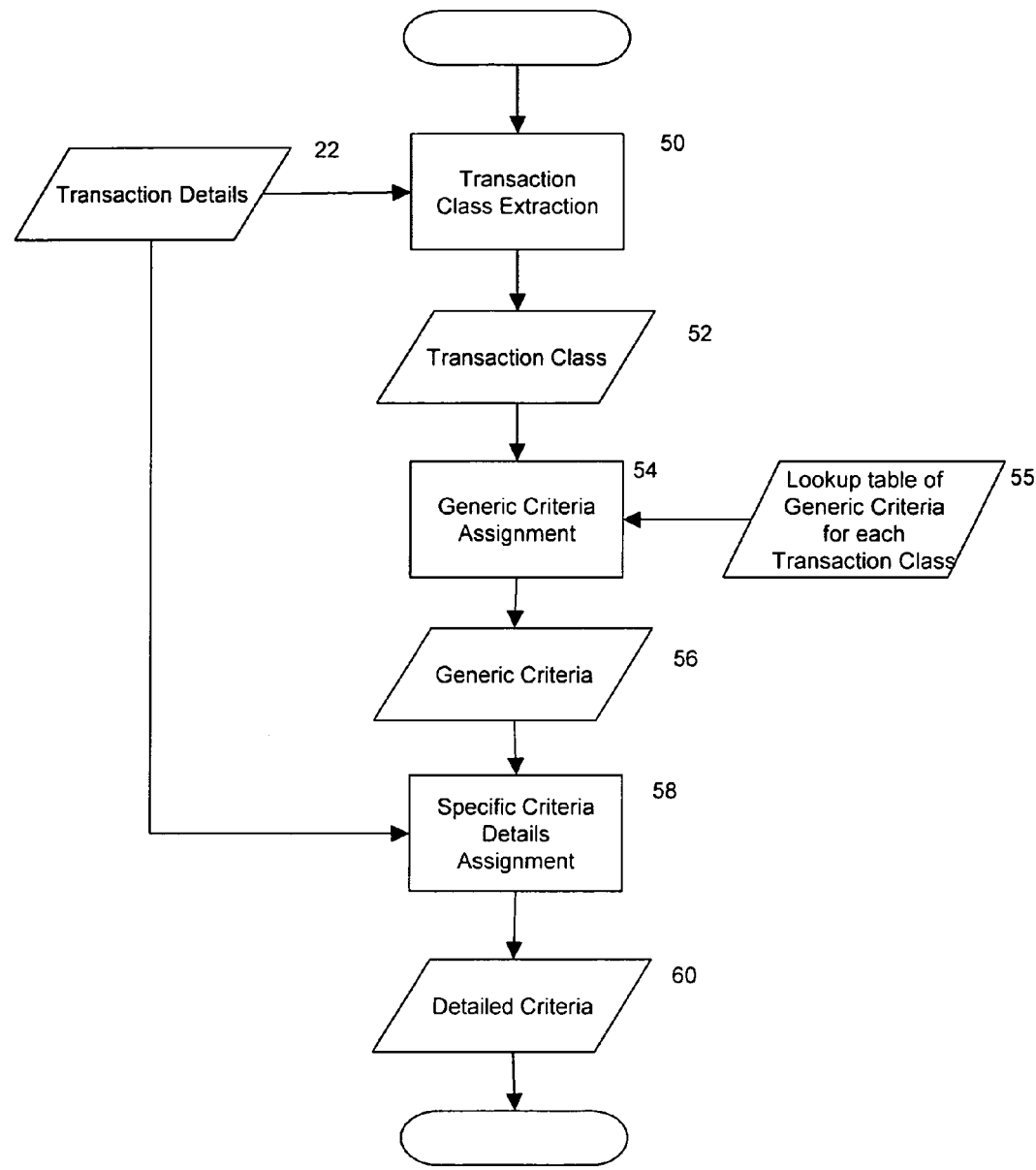
FIG. 6 is a flowchart of criteria determination processing steps performed by the invention according to embodiments herein.
Figure 7:
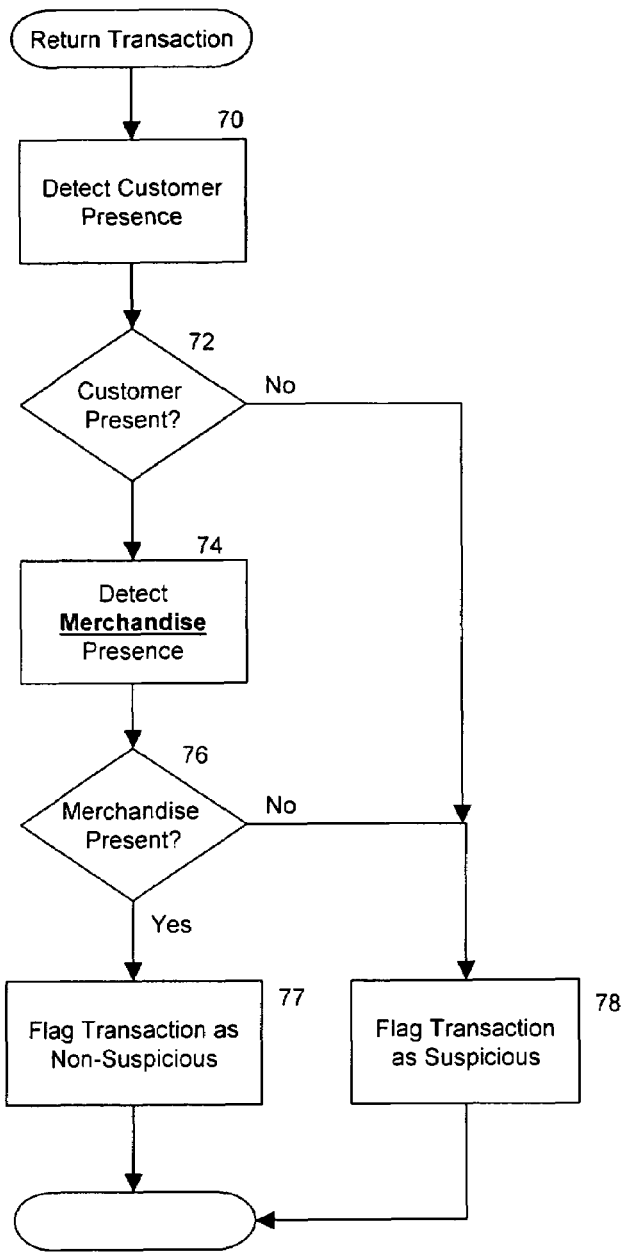
FIG. 7 is a listing of generic and detailed examples handled by the invention according to embodiments herein.

The transaction-specific criteria description (26) includes a list of visual criteria and constraint details such as camera number, location with the image (e.g., register 5) and the time ranges within the video during which the criteria are to be assessed. An embodiment of the criteria determination process is given in FIG. 6 with sample criteria descriptions in FIG. 7.

The video clip extraction process (28) then produces a video clip (30) by extracting from the video source (4) the segment of video for the time range specified in the criteria description (26).

The criteria assessment process (32) then examines the video clip (30) to assess the criteria (26) so as to determine the suspicion assessment flag (34). The suspicion assessment may alternatively be implemented as a numeric suspicion level instead of a binary flag.

The next step (36) checks if the suspicion assessment (34) is flagged or not. Alternatively, if a numeric suspicion level were used instead, the next step (36) compares the suspicion level (34) with a minimum threshold suspicion level to determine whether the transaction is considered suspicious or not.

If the transaction is considered suspicious, then the transaction report generation process (38) takes as input the transaction details (22) and the video clip (30) to produce an informative transaction report (40) which is added to the full inspection report (42).

Whether or not the transaction was found to be suspicious (in step 36), the next step (44) checks the transaction data source to see if there are more transactions to be inspected. If so, the next step (46) selects the next transaction and then loops back to the transaction extraction process (20) where the entire process is repeated.

If there are no more transactions to be processed, the process is finished.

Criteria Determination Process

The Criteria Determination Process first assigns a set of generic criteria based on transaction class, and then determines more specific parameters (such as times of interest, number of items, etc.) based on transaction details. Some of the criteria (such as customer presence for refunds) can be used alone for a more simple implementation or in conjunction with other criteria for a more comprehensive implementation.

The Criteria Determination Process (24) begins with the transaction class extraction process (50) which extracts the transaction class (52) from the transaction details (22).

The generic criteria assignment process (54) then produces a set of generic criteria (56) based on the transaction class (52) of the transaction of interest and the associated generic criteria for that transaction class according to the generic criteria lookup table (55).

The specific criteria details assignment process (58) then takes the generic criteria (56) and adds the relevant details from the transaction details (22) to produce a set of detailed criteria (60). The relevant details may include such information as the date, time, register number, number of items, list of item SKU's in the transaction, etc.

Examples of Generic & Specific Criteria

The following are examples of both generic and specific criteria created by the criteria determination process. It should be noted that the list of criteria below is by no means exhaustive. Additional criteria (such as detection of an employee standing in place of the customer) can be added or used in place of the listed criteria for each transaction class; and criteria for further transaction-class may also be added as well. Likewise, other embodiments may use one or more of the criteria below separately or in combination.

Examples of Generic Criteria
Refund Transaction (or Negative-Balance Exchange) Criteria for Suspicion:

No Customer Present OR No Item Present
Void Transaction Criteria for Suspicion:

Transaction not re-rung AND Customer Leaves with Item
Regular Sales Transaction:

Visual Number of Items>Official Number of Items (according to Transaction Details)
No-Sale:

Cash Drawer Open AND No Customer Present
Vendor Delivery:

No Vendor Present OR No Merchandise Present

Examples of Detailed Criteria
Refund Transaction Criteria for Suspicion:

Jan. 5, 2004 on Register 5 from 12:03:15 to 12:05:45

No Customer Present OR No Item Present
Exchange with Negative Net Balance ($−11.59):

Jan. 5, 2004 on Register 7 from 12:25:15 to 12:27:15

(No Customer Present or No Item Present)
Void Transaction

Jan. 5, 2004 on Register 6 from 13:05:30 to 13:06:15

Transaction Not Re-Rung AND Customer Leaves with item
Regular Sales Transaction:

Jan. 5, 2004 on Register 4 from 13:05:30 to 13:06:15

Visual Number of Items>3 items officially
No-Sale:

Jan. 5, 2004 on Register 3 from 14:10:00 to 13:11:00

Cash Drawer Open AND No Customer Present
Vendor Delivery:

Jan. 5, 2004 on Register 200 from 20:15:25 to 20:17:25

(No Vendor Present or No Merchandise Present)

The criteria can also be represented as flowcharts that show how the criteria would be assessed so as to match the Boolean logic of the criteria.

These flowcharts of the criteria demonstrate how the audit process of each transaction would be implemented as individual embodiments used separately or in combination with one another.

Refund Transaction (or Negative-Balance Exchange) Audit Process

The refund auditing criteria essentially determines if a refund transaction is likely to be fraudulent on the basis of either no customer being present or no merchandise being present during the time of the transaction.

The criteria can also be represented as flowcharts that show how the criteria would be assessed so as to match the Boolean logic of the criteria.

The flowcharts of the criteria demonstrate how the process would be implemented even as a stand-alone embodiment.

The return process would begin with the customer detection process (70). This process can be performed by computer, human, or combination thereof. Embodiments of this process are described in FIGS. 12, 15, 15b, 16, and 17.

While this particular embodiment focuses primarily on visual recognition of customer presence, it should be noted that the observation of customer presence can be performed by other alternative means including use of a pressure sensitive mat where the customer would stand in front of the counter, or infrared or sonar based presence sensors as used in automatic doorway systems.

In the next step (72), if the customer were found to NOT be present, then the flow would proceed directly to the final Suspicion Flagging process (78).

If, however, the customer were found to be present, then the flow would proceed to the Merchandise Presence Detection process (74). The processing logic of this process can be performed by computer, human, or combination thereof. Embodiments of this process are described in FIGS. 14, 15, 15b, 16, and 17. In an alternate embodiment of the present invention, the recognition portion of the process specifically may be performed by a human.

While this preferred embodiment focuses primarily on visual recognition of customer presence, it should be noted that the observation of merchandise presence can be performed by other alternative means including use of a pressure sensitive pad where merchandise would be placed the counter, infrared or sonar based presence sensors as used in automatic doorway systems, or an RFID tag reader to confirm that the merchandise being returned is present. In the present day, since registers are not equipped with any of the devices mentioned above; and since, even if RFID tag readers were in place, 100% of all merchandise is unlikely to be tagged with RFID tags for a long time to come; we are therefore currently using visual recognition instead. However, as the other technologies such as RFID tag readers make their way into registers, alternate embodiments may make use of them separately or in combination with visual recognition.

In the next step (76), if merchandise were found to NOT be present, then the flow would proceed directly to the final Suspicious Flagging process (78). If, however, the merchandise were found to be present, then the return transaction assessment process would end with the Non-Suspicious Flagging process (77).

Figure 3:
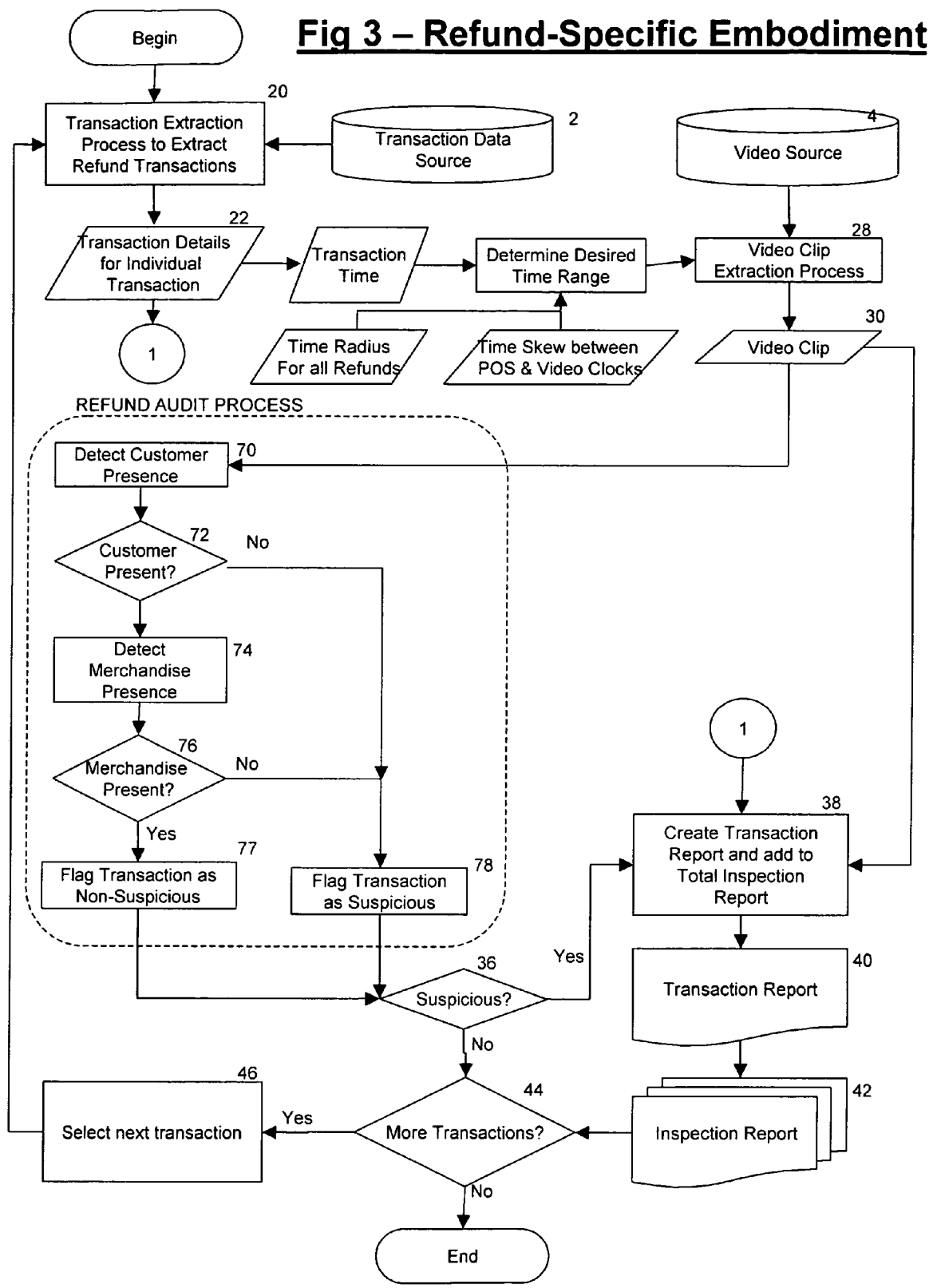
FIG. 3 is a flowchart of refund specific processing steps performed by the invention according to embodiments herein.
Figure 4:
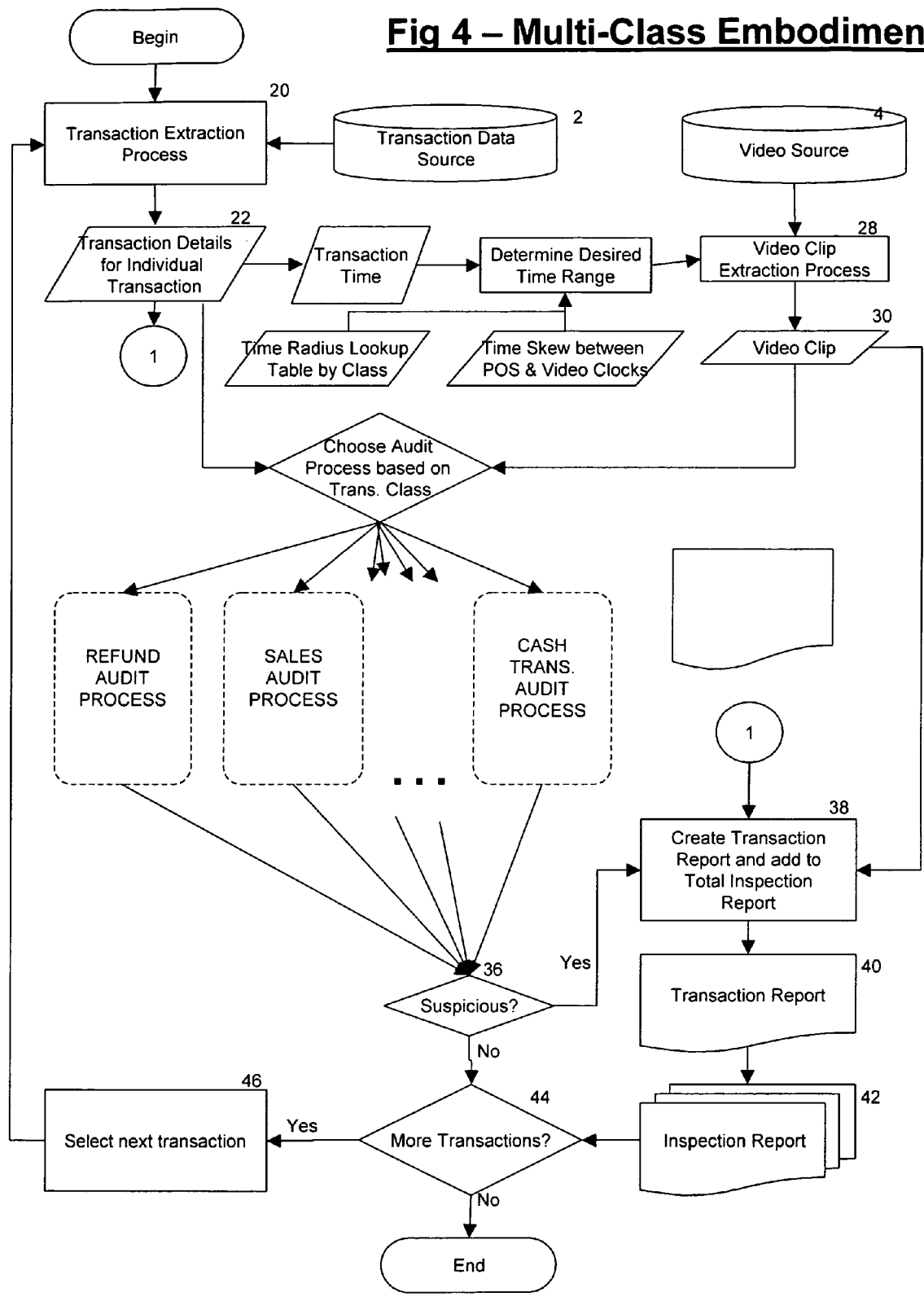
FIG. 4 is a flowchart of multi-class processing steps performed by the invention according to embodiments herein.
Figure 5:
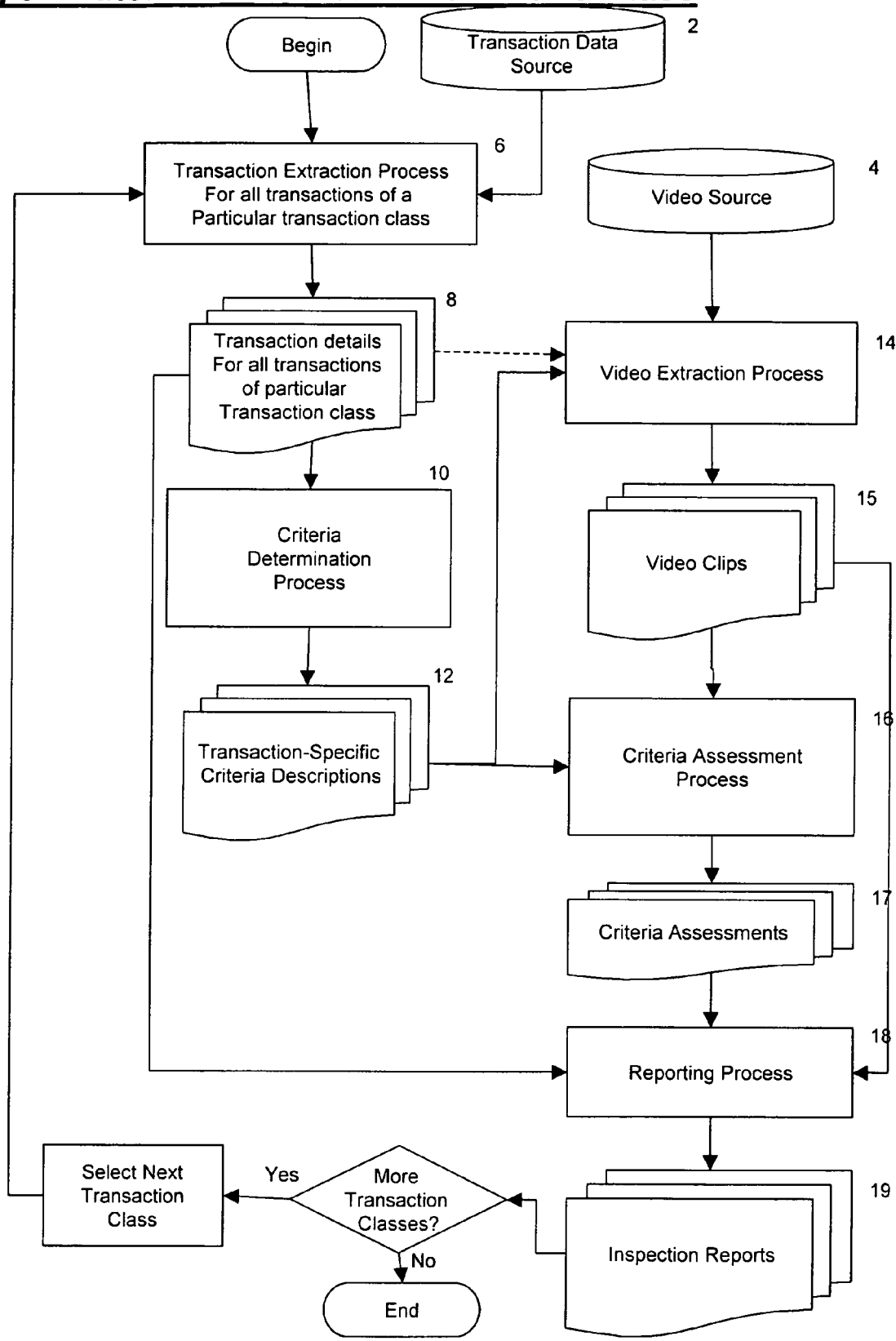
FIG. 5 is a flowchart of batch process processing steps based on transaction class performed by the invention according to embodiments herein.
Figure 8:
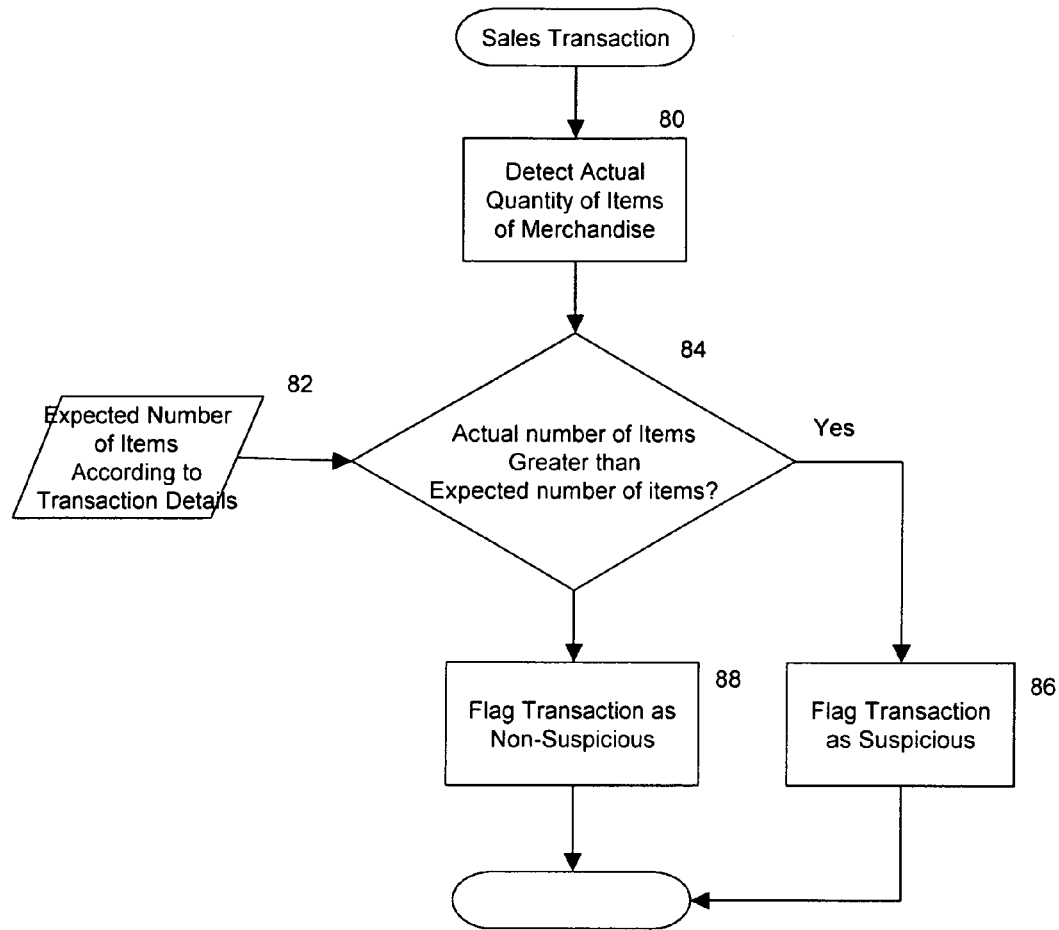
FIG. 8 is a flowchart of refund transaction (or negative-balance exchange) audit process/criteria processing steps performed by the invention according to embodiments herein.
Figure 9:
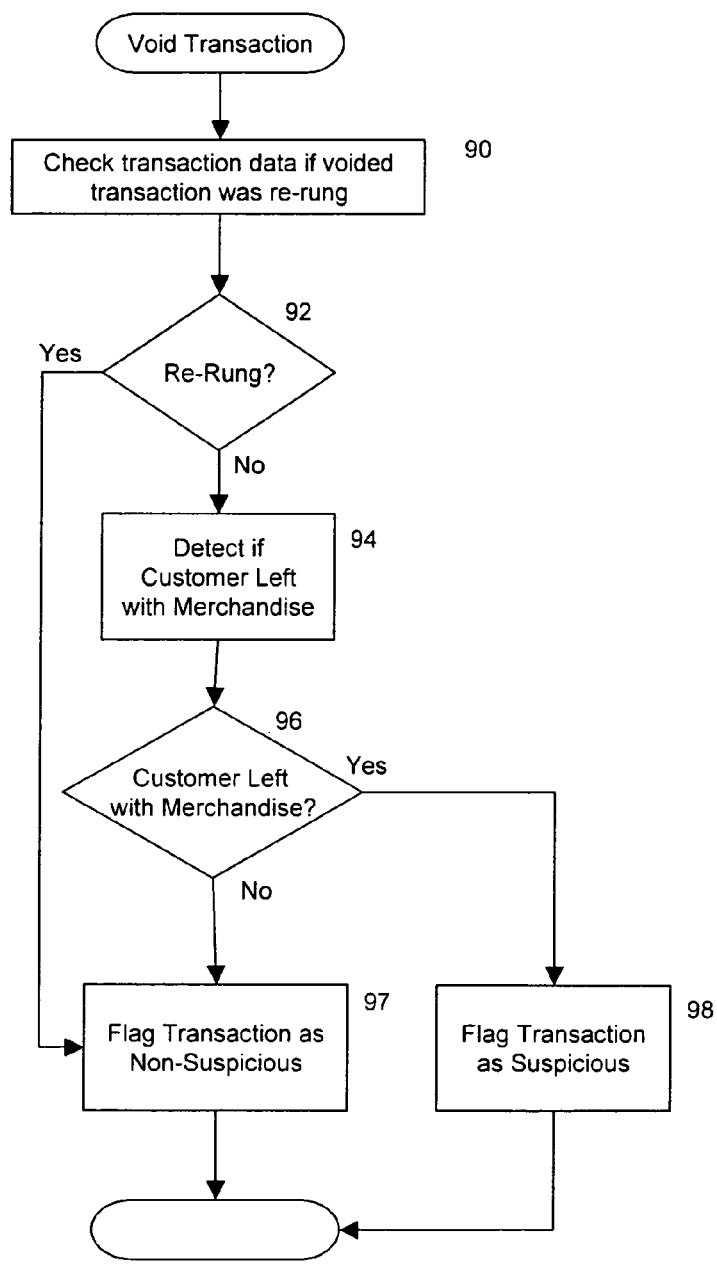
FIG. 9 is a flowchart of sales transaction audit process/criteria for pass-through detection processing steps performed by the invention according to embodiments herein.

While the flowchart in FIG. 8 is derived from criteria logic for the refund audit process, FIG. 3 demonstrates one embodiment of the refund audit process directly implemented on its own. Similarly, any of the criteria audit processes could likewise be directly implemented on their own. Likewise, as shown in FIG. 4, the direct implementation embodiment can expand to handle any number of different audit processes.

Sales Transaction Audit Process for Pass-Through Detection

The sales transaction auditing criteria essentially determines if a sales transaction is likely to be fraudulent on the basis of actual number of items of merchandise involved in the transaction being greater than the official number of items as noted in the transaction details. This kind of fraud is referred to as a pass-through and is a type of "sweethearting" where an employee defrauds the retailer by working with a friend who poses as a customer.

The criteria can also be represented as flowcharts that show how the criteria would be assessed so as to match the Boolean logic of the criteria.

Figure 18:
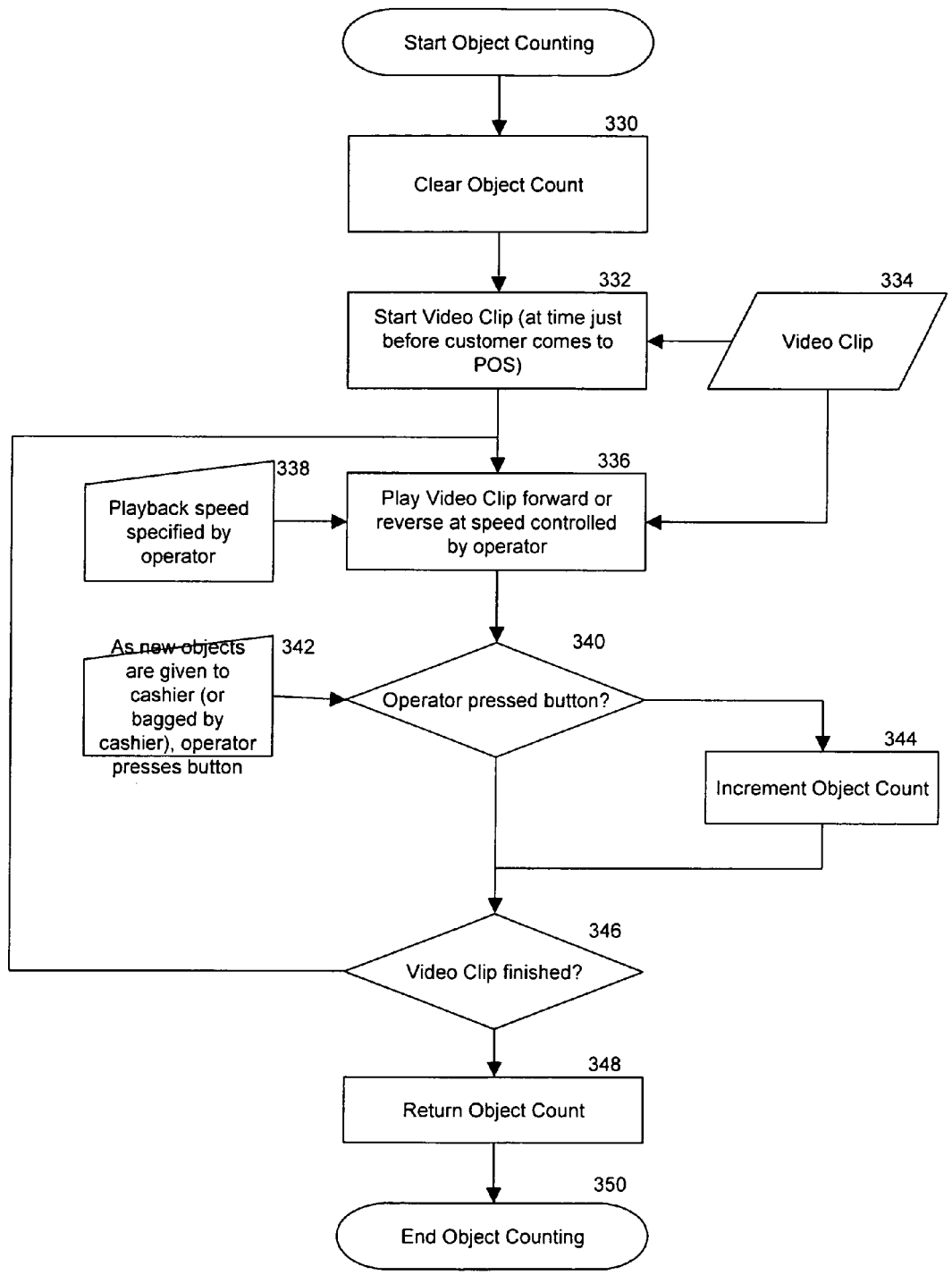
FIG. 18 is a flowchart of counting objects processing steps performed by the invention according to embodiments herein.
Figure 19:
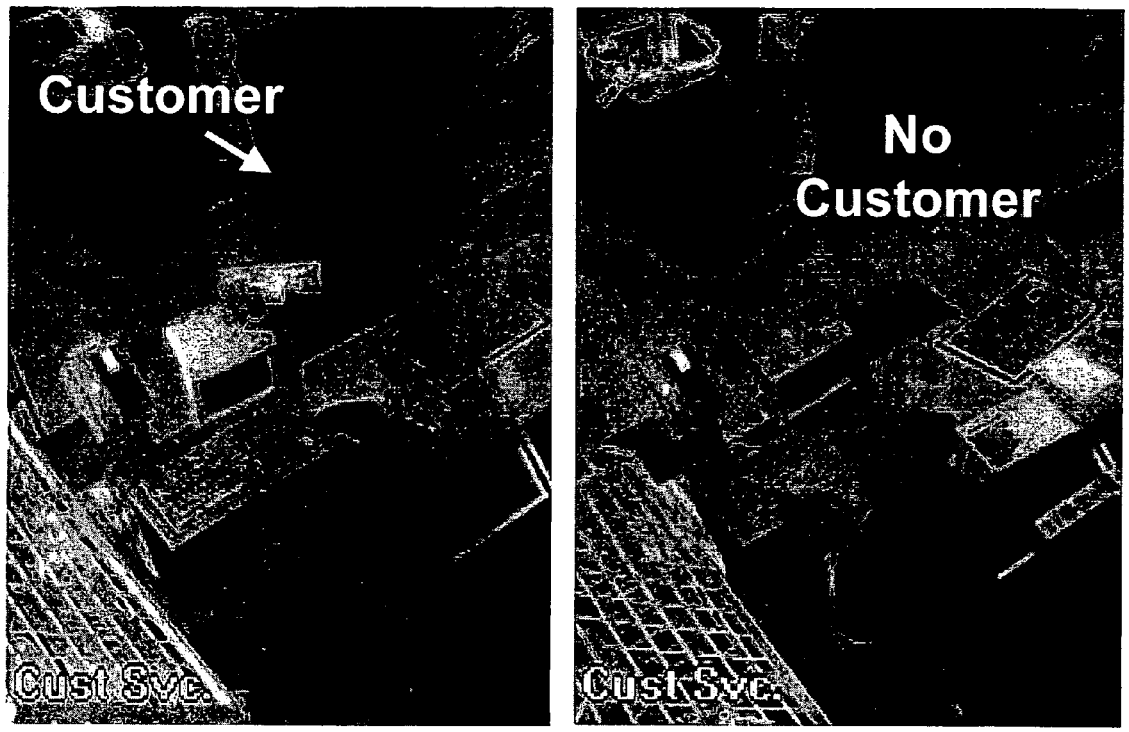
FIG. 19 is a perspective view of a transaction area with a customer and a transaction area without a customer according to embodiments of the invention herein.
Figure 20:
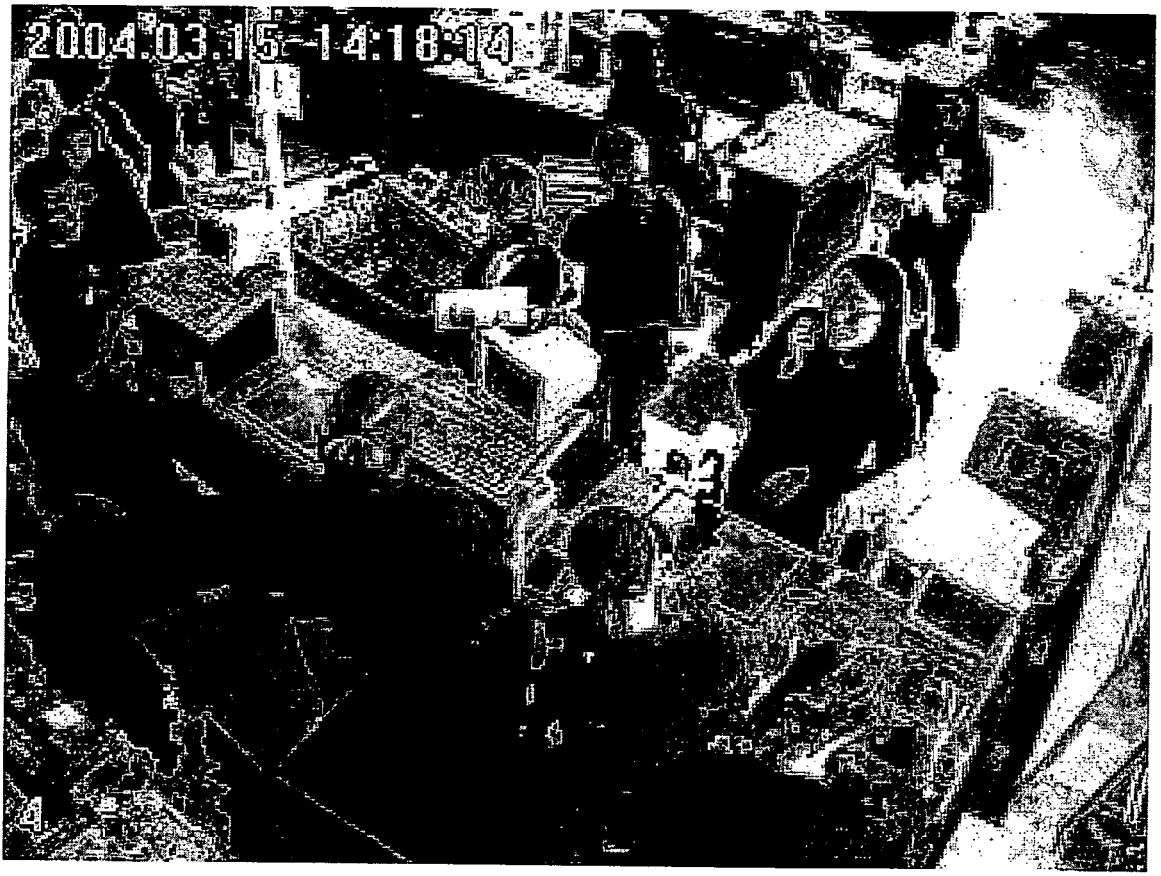
FIG. 20 is a perspective view of a transaction area with a customer according to embodiments of the invention herein.
Figure 21:
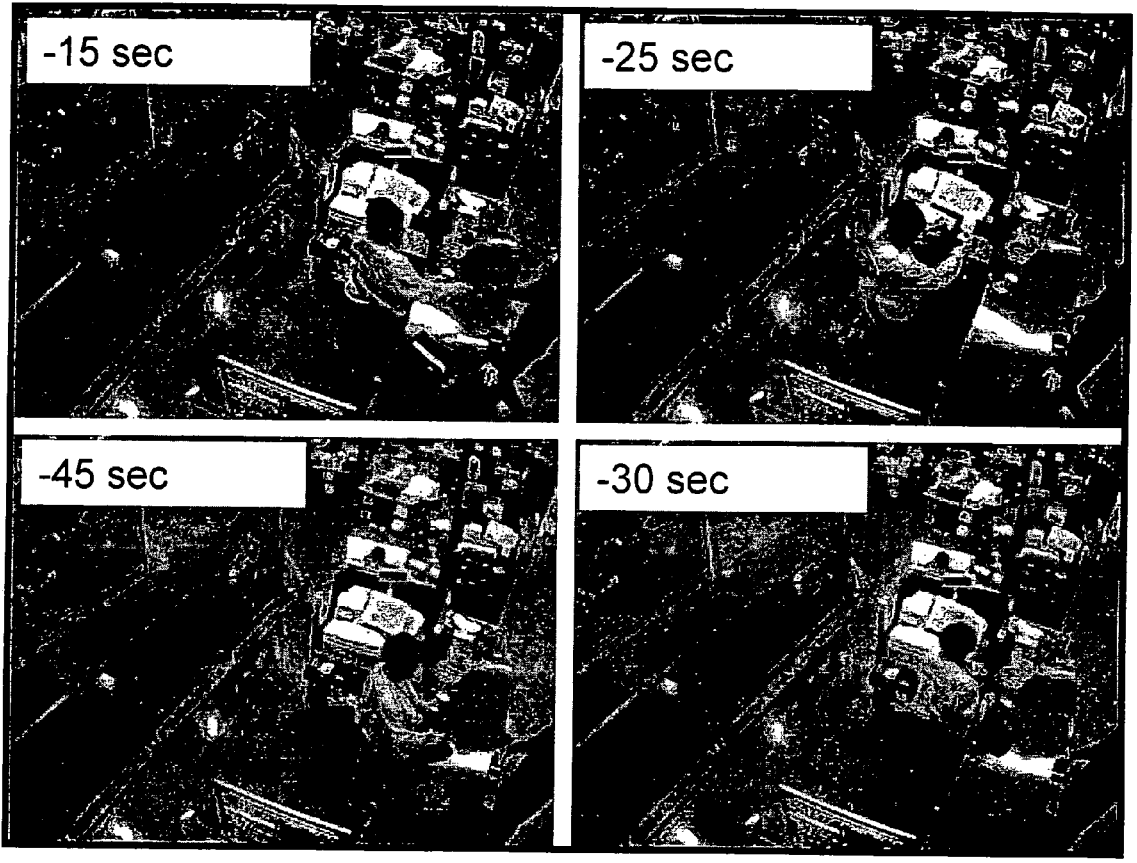
FIG. 21 is a tiled time composite image according to embodiments of the invention herein.
Figure 22:
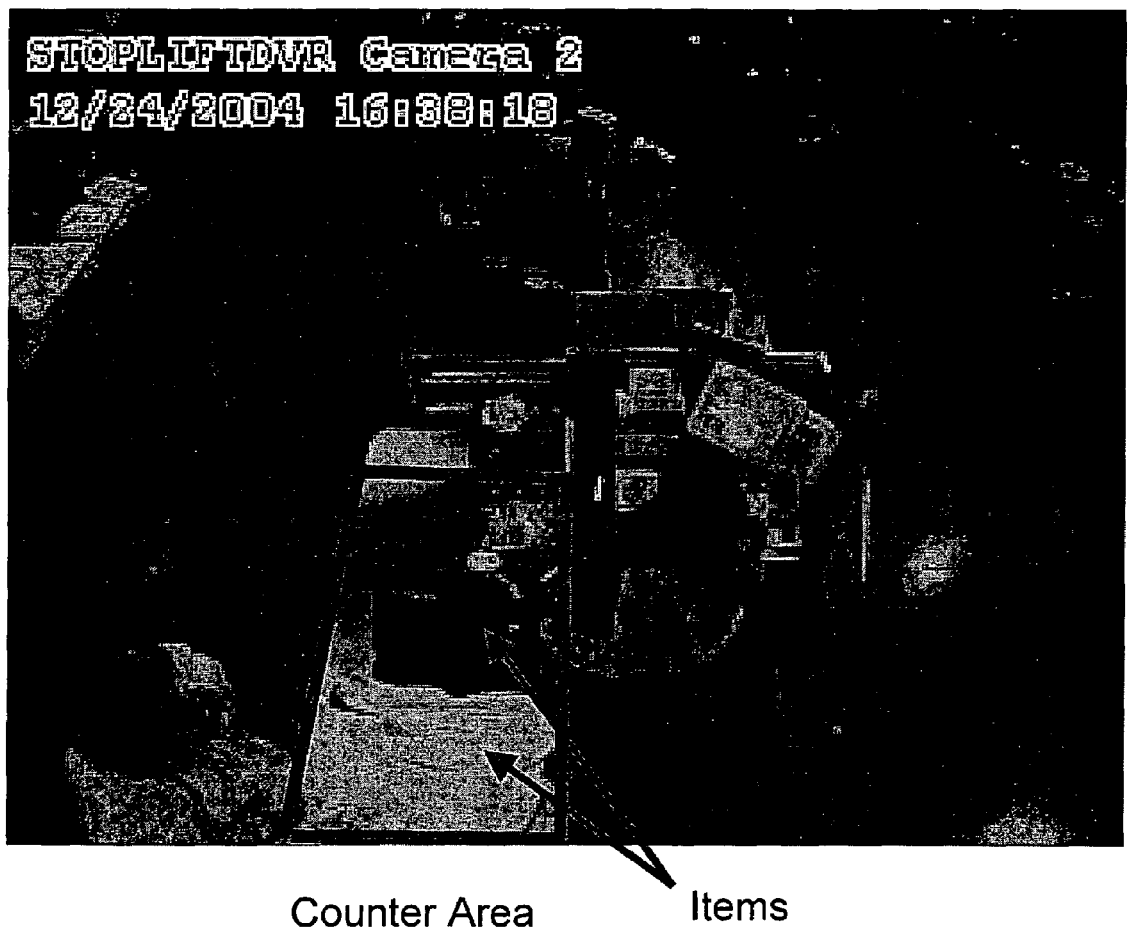
FIG. 22 is a high counter occlusion image according to embodiments of the invention herein.
Figure 23:
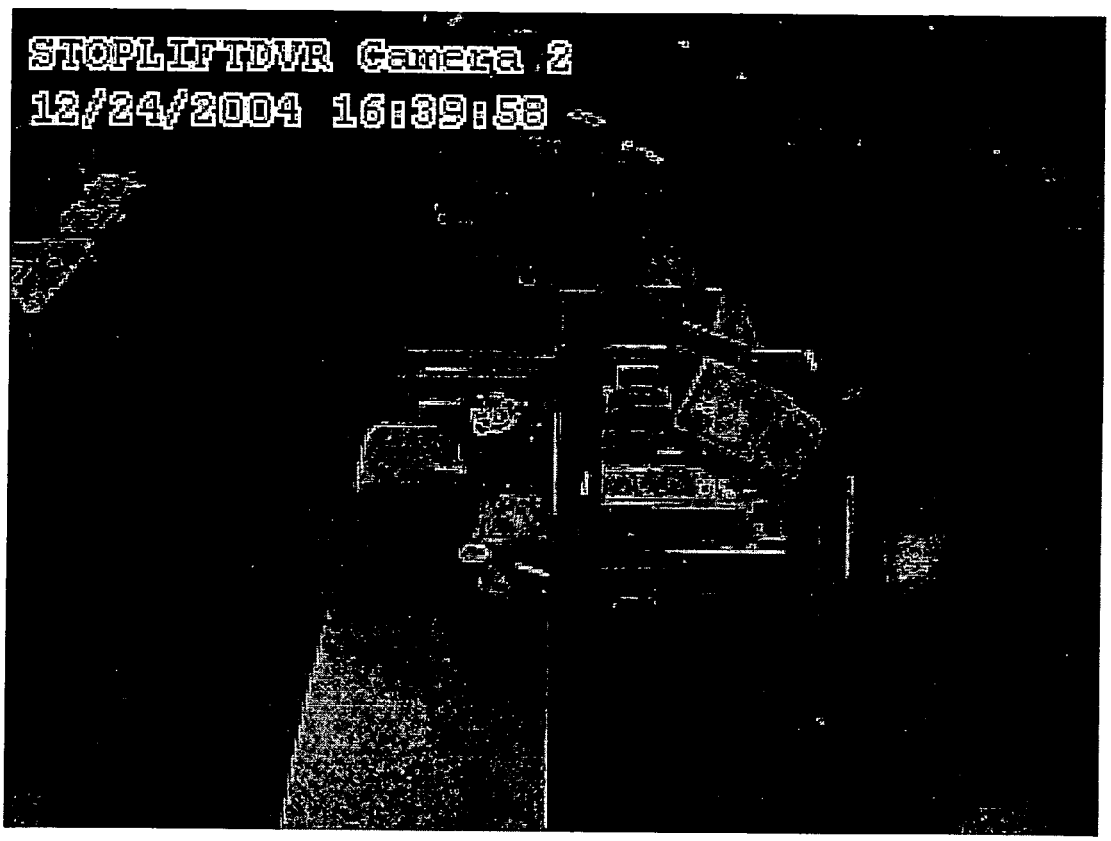
FIG. 23 is a high counter occlusion base image according to embodiments of the invention herein.
Figure 24:
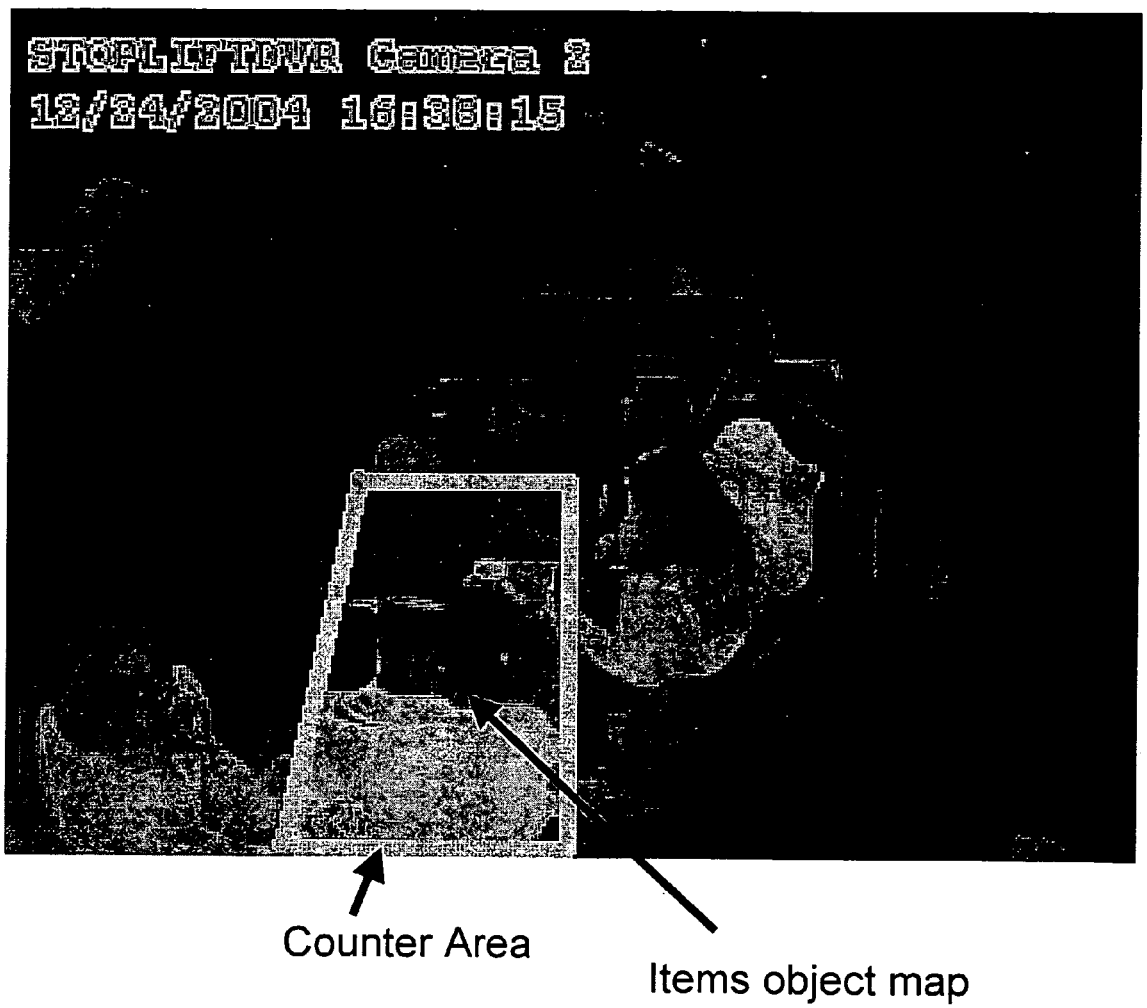
FIG. 24 is a high counter occlusion object map image according to embodiments of the invention herein.
Figure 25:
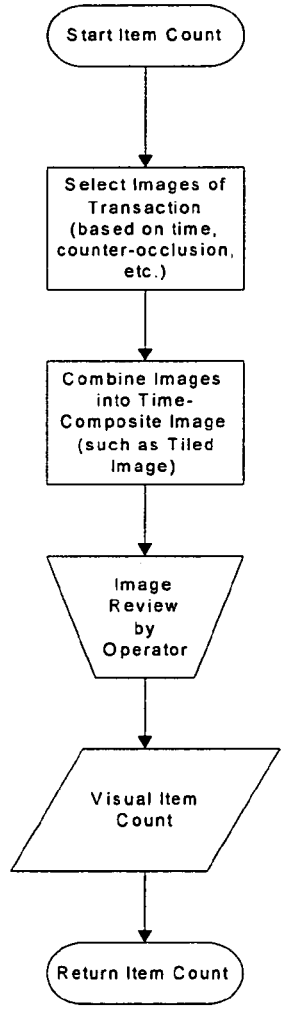
FIG. 25 is a flowchart of item count processing steps using time-composite images performed by the invention according to embodiments herein.

The sales transaction audit process would begin with the merchandise quantity detection process (80). The processing logic of this process can be performed by computer, human, or combination thereof. In an alternate embodiment of the present invention, the recognition portion of the process specifically may be performed by a human. One such embodiment is shown in FIG. 18.

While this preferred embodiment focuses primarily on visual recognition of merchandise quantity, it should be noted that the merchandise quantity detection can be performed by other alternative means including use of an RFID tag reader to count the quantity of merchandise on or near the sales counter. In the present day, since registers are not equipped with RFID tag readers; and since, even if RFID tag readers were in place, 100% of all merchandise is unlikely to be tagged with RFID tags for a long time to come; we are therefore currently using visual recognition instead. However, as the other technologies such as RFID tag readers make their way into registers, alternate embodiments may make use of them separately or in combination with visual recognition.

In the next step (84), if the number of actual items were found to be greater than the expected number of items as noted in the transaction details, then, then the flow would proceed directly to the final Suspicion Flagging process (86). Otherwise, the sales transaction audit process would end with the Non-Suspicious Flagging process (88).

Sales Transaction Audit Process for Detection of Under-Ringing and Ticket-Switching This sales transaction auditing criteria essentially determines whether or not a sales transaction is likely to be fraudulent on the basis of if an item of merchandise is being sold as to a customer as a different item for a lower price. This kind of fraud is referred to as under-ringing (another form of "sweethearting") when the cashier purposely keys in the SKU or price incorrectly rather than scanning the item. When the price sticker has been exchanged with a lower price item, it is called "ticket-switching" and may or may not be committed with the knowledge of the cashier.

In order to detect this kind of fraud, the audit process will compare the image of each item in the transaction with an image of what an item with that SKU should look like. If the comparison yields that the images are significantly different, then fraud may have been committed, and the transaction is flagged as suspicious.

To perform the item by item comparison, the audit process will employ a "count, capture, and compare" process. While counting the items in the transaction, each time a new item is counted, the image of that item will be captured, and its order in the sequence of the transaction will be noted with the image. Afterwards, in comparing the data with the findings from the video, each captured image will be compared in sequential order with the image of what the corresponding SKU (according to the data) should look like.

If there exists a catalog of images of each SKU, then the comparison process can utilize it. If no catalog exists, however, then there is another way to determine what each SKU should look like. It would require storing a library of captured images of each item along with their supposed SKU's (as determined by the "count, capture, and compare" process). While this library may have contain some mismatches (due to fraud or simple errors), an overwhelming majority of the captured images for a given SKU will match. For each SKU, that most common matching image is the image to be associated with that SKU. Thus, by using a library of previously captured item images, the necessary catalog of SKU images can be produced to make this audit process possible.

Identity Confirmation for Airport Security

Another embodiment of the process used to detect ticket-switching in retail sales can be used to detect "identity-switching" for airport security. Currently, security personnel at airports check passenger identities by looking at an official form of picture I.D. They compare the name on the I.D. with the name on the boarding pass and compare the face on the I.D. with the passenger's appearance. Unfortunately, if a good enough fake ID shows the face of a dishonest passenger, the security personnel could never tell that he was traveling under an alias.

Similar to embodiment of the sales audit process for detecting ticket-switching, an embodiment for identity confirmation would draw upon a database of faces associated with different individuals as identified by name, social security number, driver's license number, and/or other non-photographic identifiers. The system would then compare the face of the actual customer present against the picture of what that person should look like according to the database. Furthermore, if such a database is not available, another embodiment may build such a database by collecting historical pictures associated with the same non-photo identifiers. No matter how the database is formed, a non-match with the actual passenger's image could immediately be communicated to security personnel.

Voided Transaction Audit Process

Figure 10:
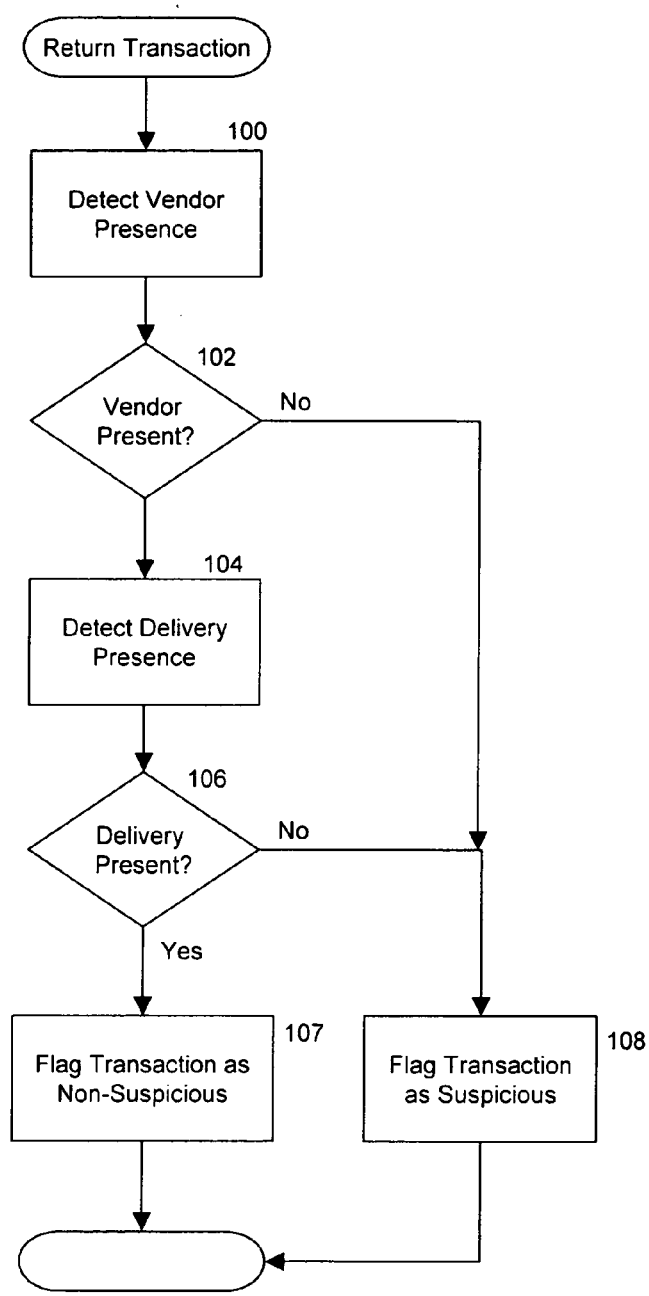
FIG. 10 is a flowchart of voided transaction audit/assessment criteria processing steps performed by the invention according to embodiments herein.

Voided transactions (including layaway cancellations) are audited by detecting whether or not the customer leaves with merchandise after a transaction that has been voided and not re-rung. An example of this process is shown in FIG. 10.

One method of auditing such transaction is to use human visual recognition to perform customer merchandise departure detection on a set of periodically sampled images organized to be view consecutively or at once on the same screen. By having the human focus his attention on the region of interest for the appropriate register, it can quickly be determined whether or not a void transaction is possibly fraudulent.

Re-ring detection can be performed by examining the transaction data looking within some radius of transactions (e.g., +/−2) to see if some minimum proportion (e.g., at least 50%) of the same SKU's from the voided sales transaction are part of another unvoided sales transaction. If so, then the voided transaction may have been re-rung before customer left, thus creating a situation where the customer should be leaving with merchandise in hand. Therefore, the voided transaction is not one of interest.

Vendor Delivery Transaction Audit Process

Vendor delivery is also prone to fraud in the form of a different kind of "sweethearting". For example, if a receiver (e.g., one who receives goods on behalf of a retailer) is supposed to receive goods from a vendor delivery person who is a friend, then they may decide to defraud the receiving company by falsifying receipt of goods that were in fact never delivered. Instead of delivering all the goods he is supposed to, the delivery person can keep the goods, resell them on the black market, and split the profits with the receiver.

Figure 11:
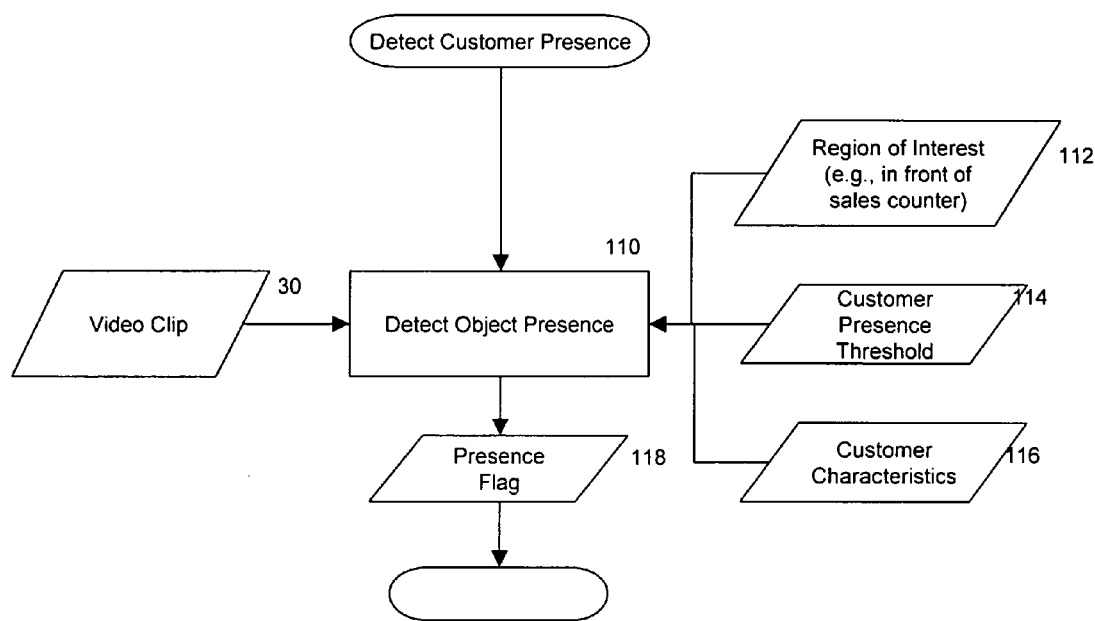
FIG. 11 is a flowchart of vendor delivery audit/assessment criteria processing steps performed by the invention according to embodiments herein.
Figure 12:
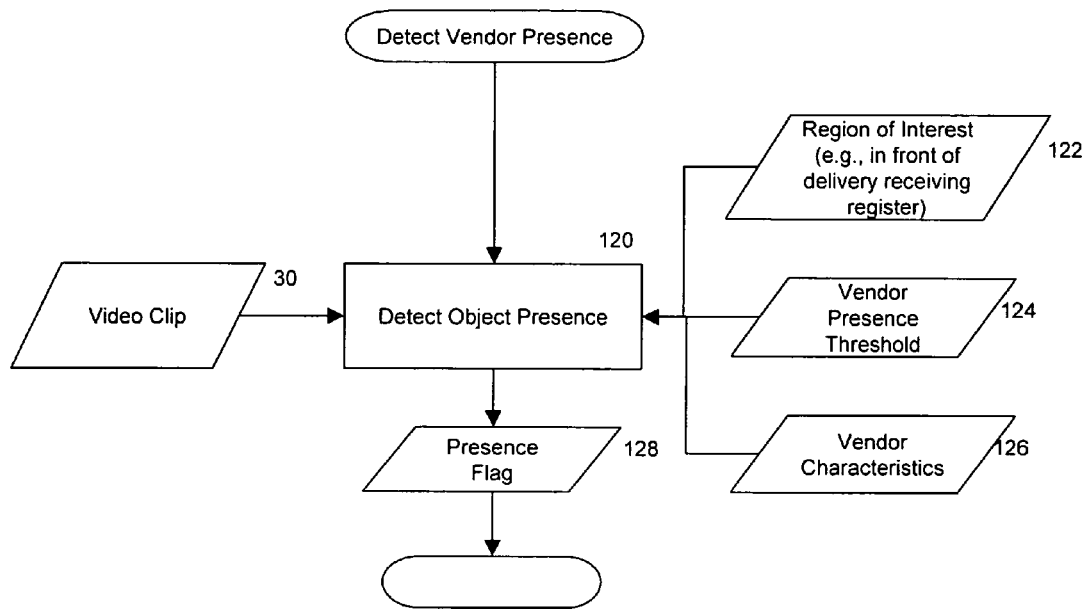
FIG. 12 is a flowchart of detect customer presence processing steps performed by the invention according to embodiments herein.

As exemplified in FIG. 11, the vendor delivery audit process is analogous to the refund audit process except that a vendor's presence is being checked at the receiving area.

For situations where there is no counter or other formal separation between the employee receiver and the vendor, the audit process will look to confirm the presence of two individuals instead of one within a possibly larger region interest.

Cash Transaction Audit Process

After any cash transaction, cash can easily be stolen from the cash drawer by an employee keeping it open after the customer has left. The cash transaction audit process examines the video clip of the time range from just before the end of the transaction to some amount of time after end of the transaction. During the course of the video clip, process will detect the presence of the customer as well as the presence of an open cash drawer. If the open cash drawer is present beyond the presence of the customer for any significant enough amount of time (i.e., above threshold amount of time), then the transaction is flagged as suspicious.

Embodiments of this audit process can implement the customer detection in a similar manner as with the refund audit process.

One embodiment of the open cash drawer detection process may involve using object presence detection focused on a very precise area out into which the drawer opens. This area would be the region of interest. The object characteristics could be comprised of an image of what the open cash drawer typically looks like. And the presence threshold could also be specified.

The object presence detection could then be performed by computer, human, or a combination thereof. The system can look for cash drawer presence and customer absence simultaneously. In some cases, simultaneous timing matters, and as opposed to time-composite imaging, a sequence of images can be used such as those used with void detection.

One method of auditing such a transaction with human visual recognition is to compile a set of periodically sampled frames from the video clip of interest. They could be organized sequentially for consecutive viewing or tiled for viewing on one page or screen by a human viewer.

Another embodiment which may be more efficient would be to use the open cash drawer detection to determine during what time range the cash register is open, and then show only those images to the human viewer.

An alternate embodiment of the open cash drawer detection process may involve actual sensor data from the POS itself. If the POS itself can indicate when the cash drawer is open and closed, then this can be compared with the timing of visually detected customer presence to see if the cash drawer was open after the customer left.

Criteria Assessment Process

The criteria assessment process may be implemented differently for different criteria. This step may be implemented by computer processes, human processes, or processes that combine the two.

Detect Customer Presence

The Customer Presence Detection process can be implemented a number of ways. The most straightforward computer implementation is described in FIG. 12.

In this embodiment, the customer is detected by performing an object presence detection process (110) while examining the region of interest (112) in the images in the video clip (30). Furthermore, the object presence detection may take into account optional additional factors such as customer presence threshold (114) and observable customer characteristics (116) that may distinguish a customer from another object such as a shopping cart. Once the object presence detection process is performed, the presence flag (118) produced by the process is returned to indicate whether or not the object in question is present.

For customer presence detection, the region of interest (112) will specify an area where a customer may possibly be during a legitimate transaction. Often, but not always, this will be the area in front of the sales counter or register. In one embodiment, this region of interest can be a two dimensional region defined with respect to the camera image itself. In another embodiment, the region of interest may be defined with respect to the flat floor and/or counter area, such that a customer detected above (i.e., standing on) that region of interest would be detected. Likewise, in another embodiment, the region of interest may simply be defined as a 3-dimensional space, such as in front of the counter but not extending all the way down to the floor which may be occluded.

The region of interest may be specified by the user or operator through a graphical user interface. One skilled in the art will recognize that there are many multiple ways in which this may be accomplished, often with the use of a mouse to draw the region of interest onto a static image of a given camera shot.

The customer presence threshold (114) specifies "how much" presence is necessary for the object presence detection process (110) to decide that an object is present. This may be the proportion or amount of time during the video clip during which the object was present within the region of interest.

The customer characteristics (116) specify observable object characteristics which aid the object presence detection (110) in identifying a customer versus another object. The characteristics may include shape, size, color range, and other characteristics. All of these characteristics usually specify approximations, tolerances, ranges, or a set of possible values to account for variations among the set of possible matches. In one embodiment, one of the customer characteristics may specify a shape approximated to a vertically elongated rectangle or oval. In contrast, in another embodiment, one of the customer characteristics may specify a shape that includes a torso, legs, arms and head. Likewise, the size may be specified to be large enough to signify an adult versus a child or other smaller object. Color (or color histogram) specification may also be used to direct the object presence detection process to ignore objects showing the same colors as the employee uniform, thus avoiding confusion of an employee for the customer. Obviously, these and other characteristics may used separately or in combination to achieve the desired specificity and efficiency of detection.

In an alternate embodiment, the region of interest (122) may be specified to be large enough to be expected to have more than one person (e.g., the cashier and the customer) in the region. In such a case, the customer presence threshold (114) and customer characteristics (116) would likewise be set so as to direct the object presence detection process (110) to confirm the presence of more than one person, where one may be reasonably expected to be the customer whose presence is being detected. This embodiment has advantages for situations where the customer and employee may not be physically separated (e.g., by a counter) or visually distinguishable (e.g., by employee uniform).

In another embodiment, the recognition portion of the process may be performed by a human. The object characteristics in such a case can essentially be a description of what a customer may look like (e.g., adult human) and may contrast with other confusable objects (e.g., adult human NOT wearing red and green employee uniform).

Detect Vendor Presence

The preferred embodiment of this will be very similar to the customer presence detection described above because the object being detected is also a human. One significant difference is that the region of interest usually, but not always, will be in the delivery receiving area, possibly in front of the receiving area register. Also, because this area may be less well defined, the region may contain both the receiver as well as the delivery person. For this reason, the object detection may be directed to look for more than one person (e.g., receiver and vendor) as opposed to only one person.

Detect Merchandise Presence

Figure 13:
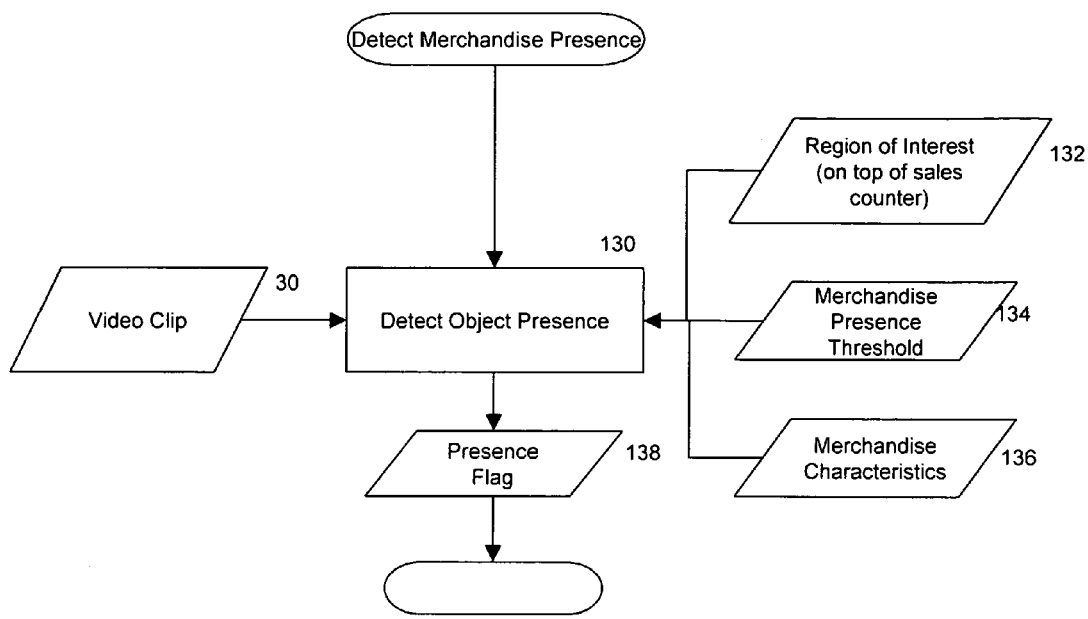
FIG. 13 is a flowchart of detect vendor presence processing steps performed by the invention according to embodiments herein.
Figure 14:
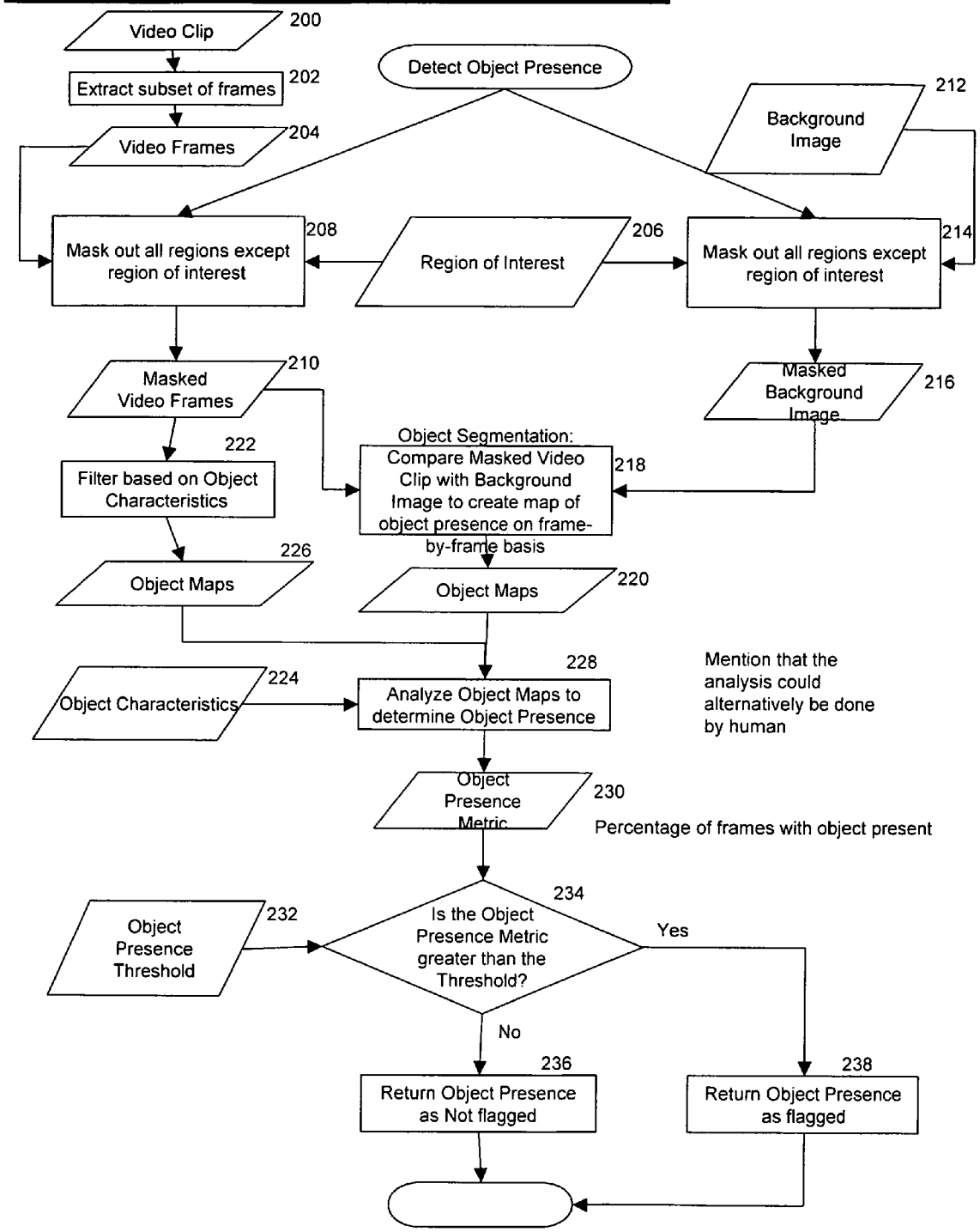
FIG. 14 is a flowchart of detect merchandise presence processing steps performed by the invention according to embodiments herein.
Figure 15:
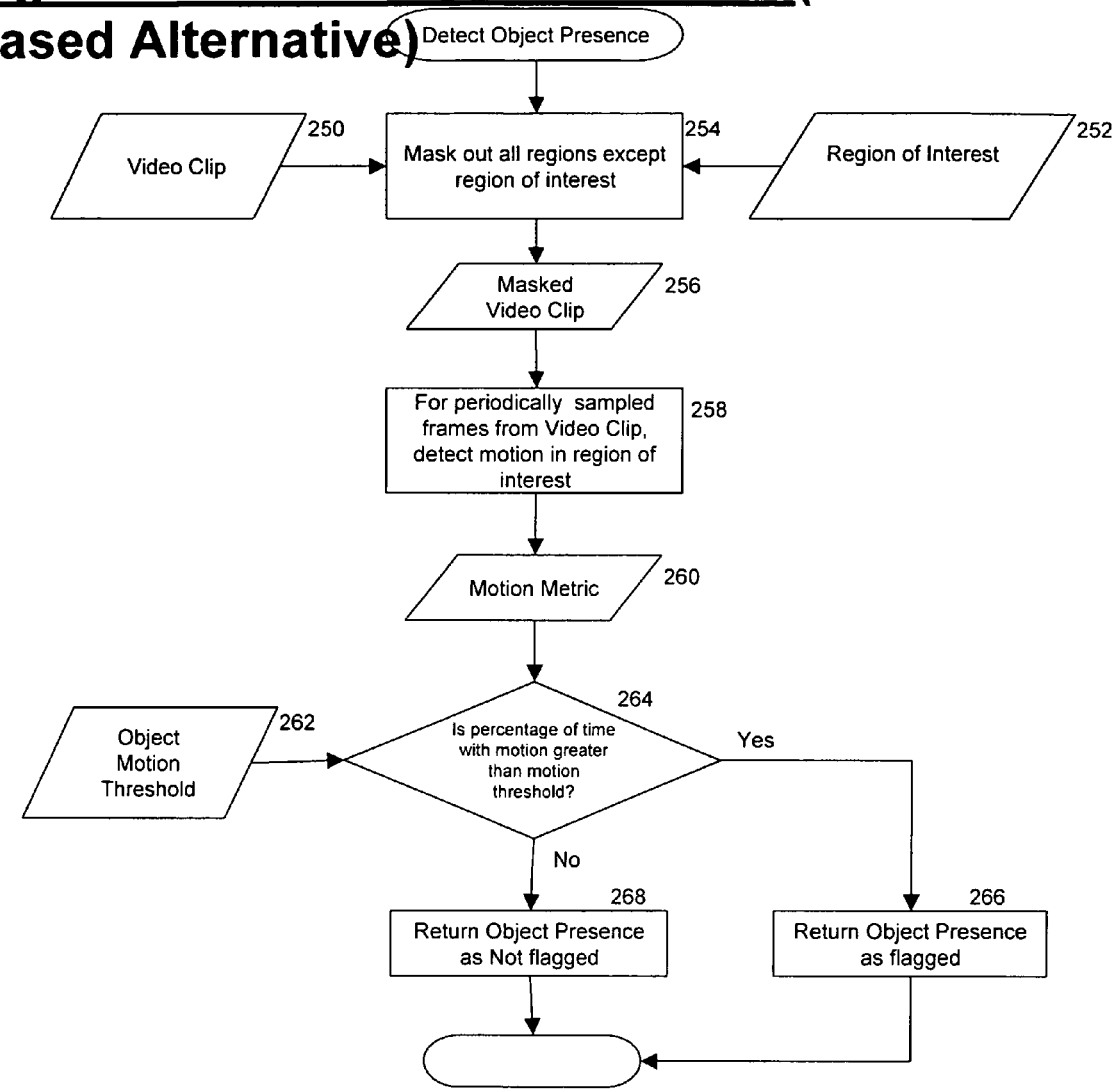
FIG. 15 is a flowchart of detect object presence processing steps performed by the invention according to embodiments herein.
Figure 16:
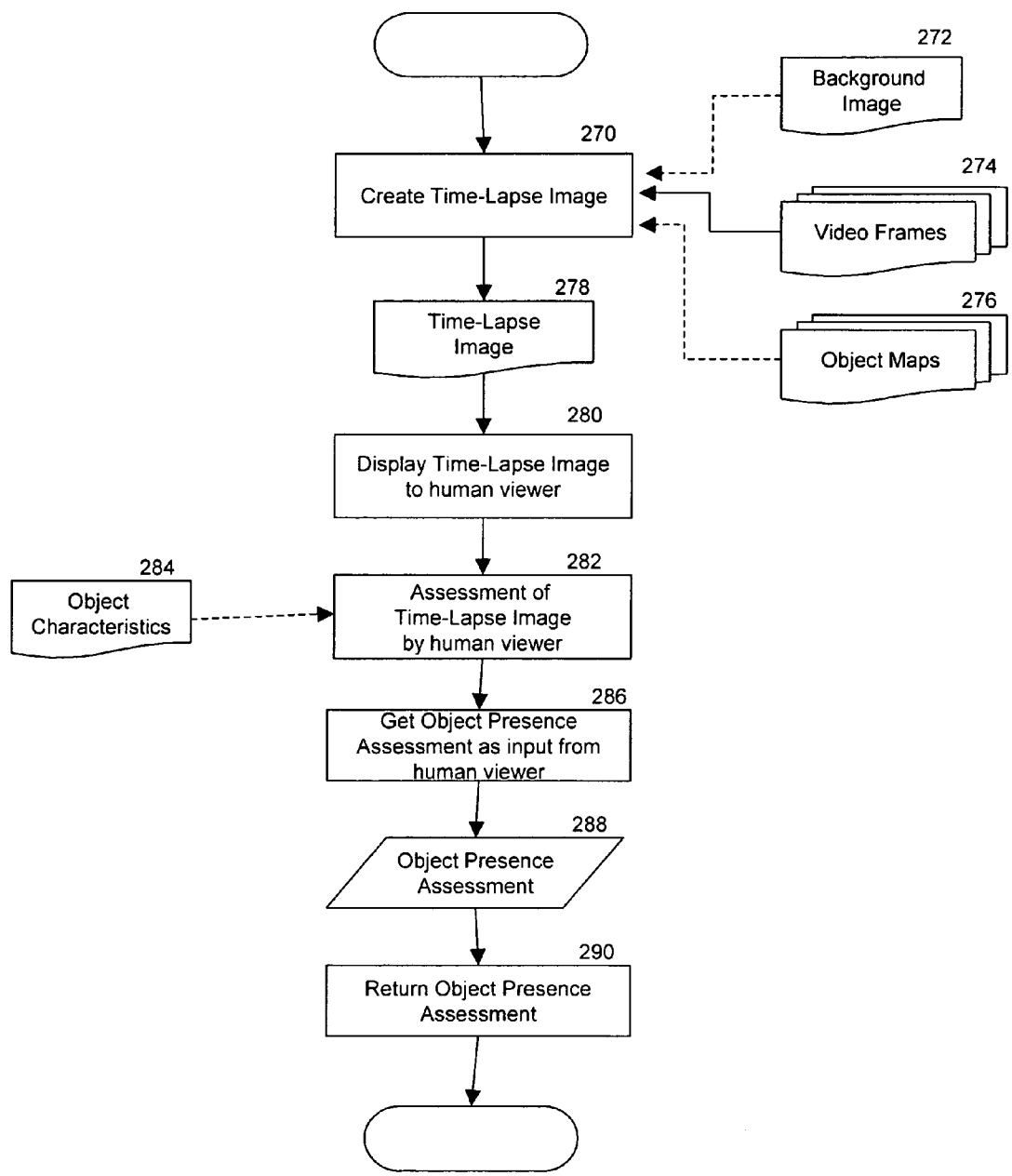
FIG. 16 is a flowchart of processing steps to analyze by time-lapse imaging performed by the invention according to embodiments herein.
Figure 17:
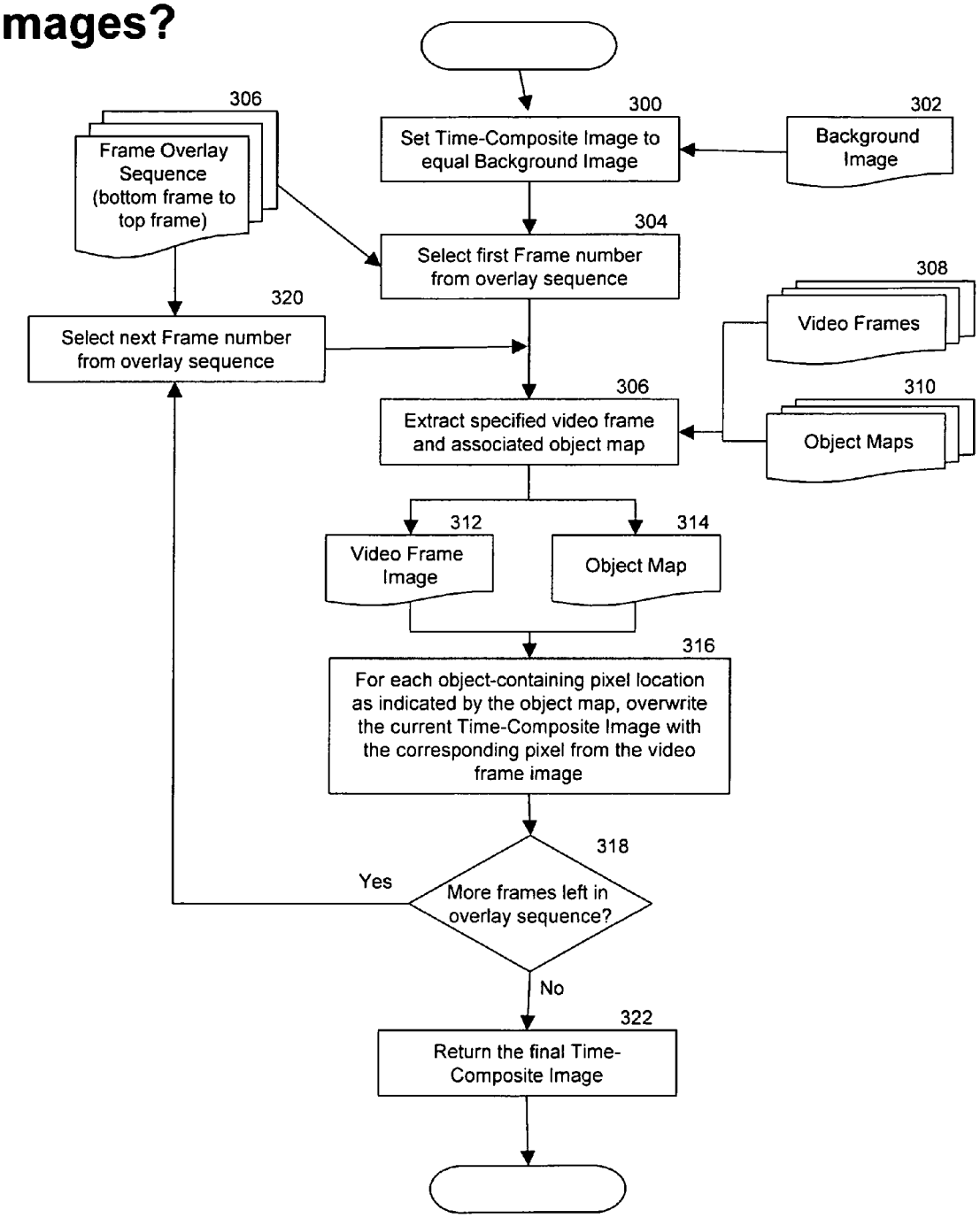
FIG. 17 is a flowchart of time-composite image creation processing steps performed by the invention according to embodiments herein.

The Merchandise Presence Detection process can be implemented a number of ways. The most straightforward computer implementation is described in FIG. 13.

In this embodiment, merchandise is detected by performing an object presence detection process (130) while examining the region of interest (132) in the images in the video clip (30). Furthermore, the object presence detection may take into account optional additional factors such as merchandise presence threshold (134) and observable merchandise characteristics (e.g., shape and size) that may distinguish an item of merchandise from another object such as a shopping bag. Once the object presence detection process is performed, the presence flag (138) produced by the process is returned to indicate whether or not the object in question is present.

For merchandise presence detection, the region of interest (132) will specify an area where merchandise may possibly be during a legitimate transaction. Often, but not always, this will be the area on top of the sales counter. In one embodiment, this region of interest can be a two dimensional region defined with respect to the camera image itself. In another embodiment, the region of interest may be defined with respect to the flat counter area and/or floor, such that an item of merchandise detected on/or above that region of interest would be detected. Likewise, in another embodiment, the region of interest may simply be defined as a 3-dimensional space, such as in front of the counter but not extending all the way down to the floor which may be occluded.

The region of interest may be specified by the user or operator through a graphical user interface. One skilled in the art will recognize that there are many multiple ways in which this may be accomplished, often with the use of a mouse to draw the region of interest onto a static image of a given camera shot.

The merchandise presence threshold (134) specifies "how much" presence is necessary for the object presence detection process (130) to decide that an object is present. This may be the proportion or amount of time during the video clip during which the object was present within the region of interest.

The merchandise characteristics (136) specify observable object characteristics which aid the object presence detection (130) in identifying a merchandise versus another object. The characteristics may include shape, size, color range, and other characteristics. All of these characteristics usually specify approximations, tolerances, ranges, or a set of possible values to account for variations among the set of possible matches. In one embodiment, one of the merchandise characteristics may specify a shape approximated to a box of some proportion. In another embodiment, the shape may be specified to be amorphous as with clothing. Likewise, the size may be approximated to be small enough to not be confused with a human. Obviously, these and other characteristics may used separately or in combination to achieve the desired specificity and efficiency of detection.

Detect Object Presence

One embodiment for detection of object presence uses comparison of frames within a video clip to the background image to determine presence within the region of interest. Using a set of object characteristics the process can further filter out unmatching objects.

The frame extraction process (202) first extracts a subset of video frames (204) from the video clip (200). Using the region of interest (206), the masking process (208) masks out (i.e., sends to pixel values to zero) all regions of the image except the region of interest. This results in a set of masked video frames (210).

Similarly, the background image (212) goes through the masking process (214) masking out all but the same region of interest (206) to create the masked background image (216).

The background image (also called the "base" image) is a static image of the same scene recorded in the video clip, but without any objects of interest. The background image can be obtained by a number of means obvious to one skilled in the art. One way is to take (manually or automatically) an actual frame from a time at which there is no activity in the scene (in a retail scenario, this may be early in the morning before the store opens). Another way is to use an adaptive backgrounding method to consistently update the background image during the course of the day's video. This has the additional advantage of robustness with respect to lighting changes that may occur during the day. Furthermore, it allows the object detection to focus only on changes in the image that may have occurred within a more limited time period. For example, in an embodiment where the background image is updated every 10 minutes, the object detection will look never see changes in the image that have occurred more than 10 minutes ago.

One embodiment of an adaptive backgrounding method is to create a "modal" image over a given period of time (e.g., 10 minutes). In the "modal" image, the value of each pixel is the mode (i.e., most commonly recurring value) of the pixel values at that same corresponding location in frames of video over the given time segment. Thus, over the course of the time segment, only the static parts of the image (such as the floor and sales counter) will be committed to the "modal" background image even if temporarily occluded by other transient objects (such as a person walking on the floor past the counter).

The masked video frames (210) then go through a comparison process (218) where they are compared with the masked background image on a frame-by-frame basis to create the object maps (220). One way of comparing a video frame with the background image is to create an absolute difference image by subtracting one image from the other and taking the absolute value of each pixel. This absolute difference image can then be thresholded to create a binary object map (220) indicating which regions of the image have changed significantly (i.e., more than the threshold) and which have not. (The threshold may be set statically or dynamically as a function of the pixel values in either or both images being compared.) To reduce noise in the object map, an embodiment may first low pass filter both the video frame and the background image before taking the absolute difference. After thresholding, any object blobs of negligible size can then be further eliminated by performing a morphological open operation. Then any small holes in the remaining object blobs can be eliminated by a morphological fill operation.

While the object maps described here are binary in nature, alternate embodiments may use non-binary object maps labeled indicating image segmentation.

Optionally, the masked video frames (210) may also be filtered to find the occurrence of certain object characteristics (224). As will be obvious to one skilled in the art, the filtering methods will vary according to the type of object characteristic being searched for. For example, if the object characteristics specify that the object of interest should contain a certain color (e.g., the color of the employee uniform which would distinguish a cashier from a customer), then, for each pixel in each masked video frame, the RGB values may be subtracted from the RGB value of the color of interest. The pixel locations with an absolute difference less than some tolerance threshold would then be considered to be close enough to the color of interest. An object map (226), most likely binary, could then be created for the frame indicating which pixel locations matched the color characteristic and which did not.

In other embodiments, depending on the filter or comparison processes that created them, the object maps (220 & 226) may be segmented and/or labeled instead of being of the binary form mentioned above.

Next, the object map analysis process (228) analyzes the comparison object maps (220) and the optional characteristic object maps (224) while taking into account the object characteristics (224) to produce an object presence metric (230). The object map analysis process (228) takes in the comparison object maps (220) produced from each masked video frame. The analysis process may then seek to determine the amount of time that an image was in the region of interest by counting the number of frames during which the object map indicates some object being present. (Since the regions outside the region of interest have already been masked, any object present according to the maps will necessarily be in the region of interest.) An object presence metric (230) which gives a sense of extent to which an object was present, such as the count of frames present with an object divided by the total number of frames, is then derived.

The object characteristics (224) can further influence the object map analysis process in a number of different ways depending on the kind of characteristics they specify. For example, if the object characteristics specify a shape and size such as a solid vertical rectangle of certain height and width (so as to approximate an adult human body), then the analysis process may correlate an image of this shape across the object map. The map or image of the resultant correlation could then be thresholded to determine where in the image there was, if any, object matching that shape.

Likewise, the characteristic object maps (226) could be used to label the isolated objects from the comparison object maps (220) as having matched the characteristics filtered for in the filtering process (222). Combining the previous two examples of object characteristics, for example, the presence metric could be determined for an adult human wearing the employee uniform colors on their body.

Next, a comparison (234) is done between the object presence metric (230) and the object presence threshold (232) to determine if the object is indeed considered present or not. If the metric is greater than the threshold, then the object presence is returned as flagged (238). If not, then the object presence is returned as not flagged (236).

Detect Object Presence (with Motion)

In an alternate embodiment, object presence detection may be performed by looking for motion, or image changes, in the region of interest over the duration of the video clip.

The process begins with Masking Process (254) which takes as input the video clip (250) and the region of interest (252).

The region of interest (252) can be in the form of a binary image which has pixels of value 1 in the areas of interest and value 0 elsewhere. For detecting customer presence, the region of interest will typically cover the area in front of the sales counter for the register specified in the transaction details. Likewise, for detecting merchandise presence, the region of interest will typically cover the area on top of the sales counter.

The masking process (254) then essentially multiplies or AND's the mask from the region of interest (252) with each frame of the video clip (250) in order to produce a masked video clip (256) showing activity only in the region of interest with all other parts of the image blacked out.

The motion detection process (258) then takes in the masked video clip (256) and looks at each consecutive frame of the clip for significant changes (e.g., greater than some pre-specified noise threshold) between frames. For greater efficiency, the motion detection process may look at periodically sampled frames rather each and every consecutive frame. Because all but the region of interest have already been masked out, only motion in the region of interest will be detected.

The motion detection process (258) will output a motion metric (260) which is a measure of the amount of motion in the masked video clip (256). This metric may take a variety of forms including the number or proportion of frames in which any motion was detected or something more complicated such as a measure of the average amount of per pixel change from frame to frame.

Next, a comparison (264) is done between the object presence metric (260) and the object presence threshold (262) to determine if the object is indeed considered present or not. If the metric is greater than the threshold, then the object presence is returned as flagged (266). If not, then the object presence is returned as not flagged (268).

Detect Object Presence (by Human)

The visual recognition needed to perform the object detection process can be also performed by human. In one embodiment, the video clip of interest may be played for the human to review during or after which the person would indicate through an input device whether or not the clip contained the object of interest (as specified by the object characteristics) in the region of interest.

For more efficiency, however, the same information from the video clip could be shown in a more quickly viewable and assessable form. In another embodiment, the clip could be played forward or backward at a faster speed (predefined or controlled by the human) during or after which the human could give a similar indication as above of whether or not the clip contained the object of interest in the region of interest.

For even further efficiency, in another embodiment, frames of the video clip of interest may be merged together into one concise time-lapse image. By using a time-lapse image in this way, the human can assess in one moment whether or not an object was ever present in the region of interest over the duration of the video clip of interest. The use of a single image to review an entire duration of video in one moment enables the human to easily do batch processing of transactions by being able to reviewing one transaction after another as simply reviewing one picture after another.

Since the time-lapse image may be produced by averaging together the frames (all frames or periodically sampled) of video, it is prone to blurring or creating semi-transparent ghost images for transient objects. This may make it difficult to assess object characteristics for the purpose of detecting the presence of a specific type of object or for detecting presence in a given orientation (e.g., customer facing the sales counter). In any event, embodiments of the invention can compare the condensed vide image (i.e., the image produced from a composite of many frames) to identify if an object was present at the transaction or not.

Other embodiments can utilize portions of the automated object presence detection to create easier to review type of time-lapse images called "time-composite" images. Using the object segmentation performed by the automated object detection process, the time-composite images can identify and "cut out" images of objects from periodically sampled frames, and then "overlap" them on top of the background and on top of each other such that they are opaque and distinct as opposed to transparent or blurry. An embodiment of time-composite image creation is given in FIG. 17.

Also, it should be noted that the object characteristics for human viewing can essentially be a description of what the object of interest may look like (e.g., adult human) and may contrast with other confusable objects (e.g., adult human NOT wearing red and green employee uniform).

Counting Objects

One way to count objects is to count their motion within a region of interest. Motion is detected by comparing consecutive periodically sampled frames. The item count is incremented every time motion is detected for at least a minimum period of time and then followed a minimum period of no or very low motion.

The region of interest is best chosen as one where significant (i.e., above threshold) motion does not occur except when an individual object of interest is added to, removed from, or moves through the region.

Take for example a supermarket checkout lane: All items will be moved by the cashier off the incoming conveyor belt and will pass by the scanner area (even if not directly in position to be scanned) and then onto the bagging area or another outgoing conveyor belt. In such a situation, useful regions of interest include the stationary areas near the ends of the conveyor belts as well as the area around the scanner window. Whenever an object moves through the region of interest, it will be counted.

In general, the least noisy or error-prone region of interest should be chosen. Alternatively, if the multiple regions are available, it may be desirable to compare and combine the motion timing and counting results from more than one region.

Another embodiment may count motion while taking into account directionality. This can be achieved by establishing more than one region of interest, such as a primary region of interest and a counting line (an adjacent, narrow region of interest). By only incrementing the object count only when motion in one region precedes the other, only objects moving from the first to second region will be counted.

For example, consider a stationary retail checkout counter. A good region of interest would be an the top of the counter where it is not obstructed by either the cashier or customer. A counting line could then be set along the edge of the counter along the side where the customer would put an item onto the counter for purchase. By only counting motion which occurs in the counting line before the larger region of interest, objects will only be counted as they move onto the counter, not off.

This same concept can be applied to the supermarket example above where multiple regions of interest may exist (though not necessarily adjacent) through which an item should pass through all or a subset of them. For example, an object could only be counted when it passed through the region at the end of the incoming conveyor belt, through the area around the scanner, and then through the region before the beginning of the outgoing conveyor belt.

Other embodiments of counting may include counting of stationary objects.

If a human is involved in the movement of the items (such as a cashier moving items of merchandise), then the bodily movements of the human may be analyzed and counted to deduce how many objects were moved.

Counting Objects by Human Operator

In alternate embodiments, the visual recognition needed to perform the object counting process can be also performed by human.

In one embodiment, the video clip of interest may be played for the human to review during or after which the person would indicate through an input device how many objects of interest were shown in the clip of interest.

For more efficiency, however, the same information from the video clip could be shown in a more quickly viewable and assessable form. In another embodiment, the clip could be played forward or backward at a faster speed (predefined or controlled by the human) during or after which the human could give a similar indication as above of whether or not the clip contained the object of interest in the region of interest. One method inputting the count would be to press a trigger or activate some other input device to increment the counter each time a new object is seen. Such an embodiment would relieve the viewer from having to keep count. An example of such an embodiment is given in FIG. 18.

Furthermore, another embodiment could use a device such as a throttle or joystick control with a trigger could be to combine the speed control with the count increment input into one input device.

Method of Grouping for Efficient Batch Processing of Human Visual Recognition

Also invented is a method of grouping of video and image data for efficient processing by human visual recognition. This method takes advantage of the fact that humans can quickly perform certain recognition tasks on a large set of images if the images are organized in such a way that maintains as much consistency image to image as possible. One embodiment, for example, organizes condensed video images (such as time-composite images) with the same camera perspective, region of interest, and recognition task in one set of image files (such as one directory of image files on a PC). The images can then be cycled through while making note of the assessment outcome of the recognition task for each image. The image-specific assessments can be made on the same software interface that allows the cycling through the images, or they can be noted in a separate place to be correlated with the images later.

One embodiment may organize such images initially on a one-image-per-transaction basis to allow for a high level "first-cut" assessment. From the set of transactions of interest identified at the initial stage, a second stage may produce a set of directories, one per transaction of interest, in which a subset of frames (such as periodically sampled frames) are stored for the purpose of a $2^{nd}$ level verification of the assessment made at the first level. If necessary, further such stages may be created each with a larger or more targeted subset of the frames from the previous level. Or, at any point, the final stage may be used where the continuous video itself is made available for review and confirmation of the high level assessment.

Report Generation Process

The report generation process is a method for reporting the results and supporting evidence for transactions of interest. The reports are comprised of a set of individual transaction reports for the transaction of interest. In one embodiment, each transaction report may contain the transaction details, the Each transaction report One embodiment combines the transaction details, the auditing assessment, and the video clip for each transaction of interest.

Another embodiment may additionally display frames of interest as determined by human, software, or combination as part of the criteria assessment process. A frame of interest for a refund audit, for example, may include one or more images where the refund is being conducted without any customer present. With frames of interest included, it may not be necessary to include the video clip as well. Leaving out the video clip in favor of frames of interest can be beneficial from a file size perspective for more quickly sharing the reports via email or other network communications.

Time Skew

The clocks on the video recording device and the POS are often not synchronized. In such cases, embodiment of the above inventions may require that they are manually synchronized. In other embodiments, the clocks may be left as they are, and, instead, a "time skew" is determined. The time skew indicates the difference between clocks and is the corrective amount that must be used to determine from the transaction data the corresponding time on the video for that transaction.

The time skew is found by finding a repeating visually discernable event from the video which can be correlated very specifically to the transaction data for a set of transactions. In one embodiment, the visual event may be the cash drawer opening. For cash transactions, the time of the drawer opening may be linked very directly to the end time of the transaction. Once the times for a number of such events have been recorded, they can be correlated with the times on the transaction data to find a consistent time-skew.

Additional Counting Methods for Sales Transaction Audit Process for Pass-Through Detection The system detects sweethearting (cashier-customer collusion) by detecting a mismatch between the expected number of items in a transaction (as implied by the transaction data from the POS) with the actual number of items (as determined from the video). This is indicative of items of merchandise being passed through without scanning.

Automated Item Counting

There are a number of means by which automated counting can be applied as described in the provisional "METHOD AND APPARATUS FOR DETECTING ITEM PASS THROUGH & MISIDENTIFICATION".

Item Counting by Human Operator Using Composite Images

As mentioned previously: "One method of auditing such a transaction with human visual recognition is to compile a set of periodically sampled frames from the video clip of interest. They could be organized sequentially for consecutive viewing or tiled for viewing on one page or screen by a human viewer."

One method of detecting the number of items in the transaction, is to present for review by a human operator an image (or multiple images) for each transaction showing one or more frames of the sales counter and the items on it. These frames may be combined into a time-composite image or shown individually to a human operator such that the transaction can be quickly inspected by human (in possible combination with computer) to see if there is an appropriate number of items involved in the transaction. The "appropriate number of items" refers to the number of items implied by the transaction data. An example of a Tiled Image (one type of time composite image) is shown in Slide 30.

Selection of Frames: Time-Based

With a time composite image such as a tiled image (slide 30), there are different ways to select the particular frames to be incorporated into the image. In one embodiment, the frames may be chosen on the basis of their times relative to the transaction's start time, end time, or both. For example, if four images are incorporated, they may be images from 45 sec, 35 sec, 25 sec, and 15 sec prior to the end of the transaction as these may be expected to be the time range during which the items in the transaction are most likely to be out in the open as separately discernable objects before they are put into a shopping bag at the end of a transaction.

Selection of Frames: Counter Occlusion

In another embodiment, the frames may be selected on the basis of Counter Occlusion. Since we would like to select images which are most likely to show multiple items separate and discernable in the image, one way to do so is to select frames which have the most area of the counter occluded by objects.

(Obviously, it may not be desirable to simply take consecutive frames with a large amount of counter occlusion as they will likely show redundant information about the scene. Instead, they may be selected from a set of separated frames, such as frames periodically sampled every 5 seconds. Alternatively, non-consecutive frames could be selected by choose frames which display a local maximum in the amount of counter occlusion.)

One way to measure counter occlusion involves measuring the amount of object area in the binary object map after performing a background subtraction on the area of the counter within the image. (See Slide 31a,b,c for an example of counter occlusion by items on the counter.)

Since the customer's or cashier's objects may contribute to the occlusion of the counter (such as in the case where the cashier reaches across to take money from the employee), the counter occlusion without their contribution will yield results more indicative of the area occluded by actual merchandise. Therefore, one embodiment may only select frames in which the customer object is not found to be connecting with the counter area. In another embodiment, after identifying the customer and cashier objects (as described regarding "CUSTOMER/EMPLOYEE PRESENCE DETECTION & TRACKING" in provisional "METHOD AND APPARATUS FOR DETECTING ITEM PASS THROUGH & MISIDENTIFICATION"), the pixels of the counter area occluded by these objects can be disregarded and instead be assumed to have the object map as they did before they were occluded by the customer or cashier objects. Put another way, the object map of the area "behind" the cashier or customer objects would be presumed to be similar to what they were before they were occluded by the customer or cashier objects. (In cases where movement can be predicted or assumed, e.g., with a moving conveyor belt, this movement would be taken into account in presuming the object map of the items occluded by the customer or cashier objects.)

In some retail stores, the items are bagged on the counter (as opposed to in a separate defined area). Therefore, another embodiment involving counter occlusion detection may choose to disregard the shopping bag itself from the area/amount of counter occlusion. One way to do so is to identify the set of colors that are most likely to be the bag in the image. Selecting the pixels of counter area that display this set of colors, and filtering them for the appropriate size range that the shopping bag may take, the pixels or area of the counter occluded by the shopping bag can be determined. Disregarding these areas, the counter occlusion area can be reduced to ignore the area occluded by the bag. (Similarly, since the presence of the bag can be detected as described above, another embodiment may only select frames in which the shopping bag is not yet present on the counter, e.g., at the beginning of the transaction before any of the items have been bagged.

Lastly, in determining the amount of counter occlusion, it should be noted that it is preferable to disregard objects on the counter that are not involved in the transaction. Since such objects are often static, one method by which to disregard them is through the use of adaptive backgrounding. Adaptive backgrounding, seeing that an item has been on the counter for an extended amount of item (e.g., longer than the duration of the transaction), will consider static objects part of the background image that is the counter. Therefore, such static objects will not appear in the background subtraction object map of the counter area from which the amount of occluded counter area is determined.

Selection of Frames: Object Disconnect/Connect Detection

As described in the provisional "METHOD AND APPARATUS FOR DETECTING ITEM PASS THROUGH & MISIDENTIFICATION", there are a number of means by which the counting of items involved in a transaction can be automated. Should a more hybrid human-&-computer approach be desired, an automated counting means may be used to aid in the selection of frames to be shown to the operator.

In one embodiment, for example, object disconnect/connect detection may be used to identify events where the cashier may be either picking up a new item from the counter (a connect event), or putting an item down onto the counter (a disconnect event). Involving these event times in the frame selection process may make choose times and frames where the items are easier to visually distinguish than at other times. For instance, in a clothing store, where clothes may be piled on each other and difficult to uniquely distinguish and count, it would be much easier for a human operator to visually distinguish an item while the cashier has an individual item in his or her hand at the time between the pickup and putting-down of the item.

Prioritization of Transactions

When a dishonest customer (collaborating with a dishonest cashier for "sweethearting") wants to produce a transaction to appear legitimate while walking off with additional unscanned items without paying for them, then that person wants to spend as little money as possible in producing the transaction with the items that were actually scanned. Therefore, the number of items actually scanned is typically very low. Furthermore, the value of the scanned items in generally low. This reasoning can be used to prioritize the review of transactions, and therefore the review of their time-composite images (in the form of tiled images or otherwise).

For example, highest priority for immediate inspection (and confidence level for possible subsequent suspicion) may be given to the single-item, low-value transactions. Likewise lowest priority may be given to high quantity, high value transactions as these are least likely to be sweethearting transactions. In situations where all transactions cannot be reviewed, lower priority transactions can be disregarded in favor of inspection of the higher priority transactions.

Grouping of Transactions

One way to make human review of a large number of transactions more efficient is to group them by the number of items officially expected in the transactions as implied by the transaction data. For example, all one-item transactions could be grouped together. This way, as the human operator moves from one transaction to the next, and therefore one time-composite image to the next, the operator knows that he or she is looking specifically for more than one item to be involved in the transaction to make it suspicious of fraud. If the operator views a separate group of two-item transactions, then the operator will not accidentally confuse these with one-item transactions.

It has not gone unnoticed that the official expected POS item count could be simply displayed on the screen, but we believe that grouping makes the human review process more efficient than simply displaying the number to be compared.

Another alternative to grouping is to not let the operator know the expected number of items at all. This has the advantage of making the counting process more "blind" or unbiased. While this may be true, we believe it may also make the human review process less directed and therefore less time efficient.

It should also be noted more generally that transactions can also be grouped on the basis of other criteria such as the dollar value of the transaction, type of items involved in the transaction, etc.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A method for detecting a transaction outcome, the method comprising:
   obtaining video data associated with a transaction area;
   obtaining transaction data concerning at least one transaction that occurs at the transaction area;
   correlating the video data associated with the transaction area to the transaction data to identify specific video data captured during occurrence of that at least one transaction at the transaction area, wherein correlating the video data includes:
      performing a video extraction process that produces a condensed video clip by extracting from the video data corresponding segments of video associated with a time range of the transaction specified in the transaction data; and
   based on a transaction classification indicated by the transaction data, processing the video data to identify appropriate visual indicators within the video data that correspond to the transaction classification, wherein processing the video data includes:
      comparing the correlated video data to expected transaction video characteristics to determine if the correlated video data substantially matches the expected transaction video characteristics, and if the correlated video data does not substantially match the expected transaction video characteristics, indicating a transaction outcome having a first value, wherein comparing the correlated video data includes:
      searching frames of the condensed video clip for at least one frame containing expected transaction video characteristics to determine if they substantially match.

2. The method of claim 1 wherein comparing the correlated video data to expected transaction video characteristics comprises examining the correlated video data to identify a presence factor indicating whether or not at least one of a customer or a product is present within the correlated video data upon occurrence of the at least one transaction.

3. The method of claim 1 wherein indicating a transaction outcome having a first value indicates that the transaction is fraudulent.

4. The method of claim 1 wherein indicating a transaction outcome having a first value indicates an audit characteristic of the transaction.

5. The method of claim 4 wherein the audit characteristic of the transaction is at least one of:
   an identity of a product associated with the transaction;
   an identity of a person responsible for performing the transaction;
   an efficiency of the person responsible for performing the transaction; and
   an identity of customer participating in the transaction.

6. The method of claim 1 comprising:
   determining if the correlated video data does substantially match the expected transaction video characteristics, and if so, indicating a transaction outcome having a second value.

7. The method of claim 6 wherein indicating a transaction outcome having a first value indicates that the transaction is legitimate.

8. The method of claim 1 wherein searching frames of the condensed video clip for at least one frame containing expected transaction video characteristics to determine if they substantially match comprises:
   processing the condensed video clip to identify if at least one of a customer and a product is absent in the condensed video clip.

9. The method of claim 1 wherein correlating the video data associated with the transaction area to the transaction data to identify specific video data captured during occurrence of that at least one transaction at the transaction area comprises:
   performing a video image processing technique to produce a processed video clip by superimposing frames from the video data corresponding to segments of video associated with a time range of the transaction specified in the transaction data; and
   wherein comparing the correlated video data to expected transaction video data comprises:
   searching the processed video clip for presence of the expected transaction video data to determine if the processed video clip contains a required item.

10. The method of claim 1 wherein correlating the video data associated with the transaction area to the transaction data comprises:
    condensing images in the obtained video data to produce at least one condensed video image that indicates the existence or non-existence of an object within the transaction area during a time of transaction occurrence.

11. The method of claim 10 wherein condensing images in the obtained video data comprises producing a plurality of condensed video images.

12. The method of claim 10 comprising providing the at least one condensed video image to a human viewer to allow the human viewer to determine if the transaction is fraudulent.

13. The method of claim 1 wherein processing the video data to identify appropriate visual indicators within the video data that correspond to the transaction classification comprises:
    processing the video data to identify a representation of the object in the video data which indicates transaction data related to the object should be included in the transaction data; and
    determining there is no transaction data related to the object's representation in the transaction data.

14. The method of claim 1 wherein processing the video data to identify appropriate visual indicators within the video data that correspond to the transaction classification comprises:
    performing a visual recognition process based on the transaction classification that indicates what should have happened during the at least one transaction in comparison to what actually happened during the at least one transaction.

15. The method of claim 14 wherein performing a visual recognition process comprises:
    constraining the visual recognition process to look for specific objects in the video data based on the transaction classification.

16. The method of claim 15 wherein constraining the visual recognition process to look for specific objects in the video data comprises:
    if the transaction classification indicates the transaction is a sale of an item, performing a visual recognition process to identify absence of a product in the video data.

17. The method of claim 15 wherein constraining the visual recognition process to look for specific objects in the video data comprises:
    if the transaction classification indicates the transaction is a return of an item, performing a visual recognition process to identify presence of at least one of a customer and a product in the video data.

18. A method for detecting a transaction outcome of a product transaction in a environment, the method comprising:
    obtaining video data associated with a transaction area within which a purported transaction is indicated to have taken place within transaction data collected during the purported transaction; and
    processing the obtained video data associated with the transaction area that is captured during a time of the purported transaction to produce the transaction outcome, wherein processing the obtained video data includes:
    obtaining a transaction classification indicated by transaction data;
    processing the video data to identify appropriate visual indicators within the video data that correspond to the transaction classification, wherein processing the video data to identify appropriate visual indicators comprises performing a visual recognition process based on the transaction classification that indicates what should have happened during the at least one transaction in comparison to what actually happened during the at least one transaction as indicated in the video data;
    wherein processing the obtained video data further includes:
    examining the obtained video data to count a number of items associated with the purported transaction; and
    comparing the number of items counted from the examination of the obtained video data to a number of items indicated as being associated with transaction data of the purported transaction, and if the number of items associated with the purported transaction does not equal the number of items examined within the obtained video data, indicating that the purported transaction appears to be fraudulent.

19. The method of claim 18 wherein performing a visual recognition process comprises:
    constraining the visual recognition process to look for specific objects in the video data based on the transaction classification.

20. The method of claim 18 wherein processing the obtained video data associated with the transaction area that is captured during a time of the purported transaction to produce the transaction outcome comprises:
    determining if the obtained video data indicates that the purported transaction appears to be fraudulent.

21. The method of claim 18 wherein processing the obtained video data associated with the transaction area that is captured during a time of the purported transaction to produce the transaction outcome comprises:
    identifying audit data based on processing the obtained video data to identify an auditable characteristic of the obtained video data.

22. The method of claim 18 wherein processing the obtained video data includes:
    examining the obtained video data to identify if a product associated with the purported transaction is present within the obtained video data, and if the product associated with the purported transaction is not present within the obtained video data, indicating that the purported transaction appears to be fraudulent.

23. The method of claim 18 wherein processing the obtained video data associated with the transaction area that is captured during a time of the purported transaction to determine if the video data indicates that the purported transaction appears to be fraudulent comprises:
    obtaining transaction data associated with the purported transaction, the transaction data including a time at which the purported transaction takes place;
    correlating the time at which the purported transaction takes place to a time in the obtained video to identify a segment of the obtained video data that would contain a confirmation image indicating if the purported transaction were fraudulent; and
    digitally comparing the segment of the obtained video data to expected transaction video characteristics to determine if the segment of obtained video data substantially matches the expected transaction video characteristics to determine if the obtained video data indicates that the purported transaction appears to be fraudulent.

24. A method for detecting a transaction outcome of a product transaction in a environment, the method comprising:
    obtaining video data associated with a transaction area within which a purported transaction is indicated to have taken place within transaction data collected during the purported transaction; and
    processing the obtained video data associated with the transaction area that is captured during a time of the purported transaction to produce the transaction outcome, wherein processing the obtained video data includes:
    obtaining a transaction classification indicated by transaction data;
    processing the video data to identify appropriate visual indicators within the video data that correspond to the transaction classification, wherein processing the video data to identify appropriate visual indicators comprises performing a visual recognition process based on the transaction classification that indicates what should have happened during the at least one transaction in comparison to what actually happened during the at least one transaction as indicated in the video data;
wherein processing the obtained video data further includes:
examining the obtained video data to identify if a person associated with the purported transaction is present within the obtained video data, and if the person associated with the purported retail transaction is not present within the obtained video data, indicating that the purported transaction appears to be fraudulent.

25. The method of claim 24 wherein examining the obtained video data is performed automatically via digital image processing techniques without requiring human intervention to determine if the purported transaction appears to be fraudulent.

26. The method of claim 25 wherein examining the obtained video data is performed automatically and dynamically during performance of the purported transaction.

27. The method of claim 25 wherein the purported transaction is purchase of an item at a retail point of sale terminal.

28. The method of claim 25 wherein the purported transaction is return of an item at a retail point of sale terminal.

29. The method of claim 25 wherein the purported transaction is a voided sale of an item at a retail point of sale terminal.

30. The method of claim 25 wherein the purported transaction is a exchange of an item at a retail point of sale terminal.

31. The method of claim 25 wherein the purported transaction is a vendor delivery of an item at a vendor delivery location.

32. The method of claim 24 wherein examining the obtained video data is performed by a human who then enters a transaction review response that indicates if the human thought performance of the purported transaction is fraudulent.

33. A method for detecting a transaction outcome of a product transaction in a environment, the method comprising:
obtaining video data associated with a transaction area within which a purported transaction is indicated to have taken place within transaction data collected during the purported transaction; and
processing the obtained video data associated with the transaction area that is captured during a time of the purported transaction to produce the transaction outcome, wherein processing the obtained video data includes:
obtaining transaction data associated with the purported transaction, the transaction data including a time at which the purported transaction takes place;
correlating the time at which the purported transaction takes place to a time in the obtained video to identify a segment of the obtained video data that would contain a confirmation image indicating if the purported transaction were fraudulent, wherein correlating the time includes:
synchronizing clock mechanisms within a video capture mechanism that captures the video data and within a computer system that records the purported transaction.

34. The method of claim 33 wherein processing the obtained video data includes:
obtaining a transaction classification indicated by transaction data; and
processing the video data to identify appropriate visual indicators within the video data that correspond to the transaction classification;
performing a visual recognition process based on the transaction classification that indicates what should have happened during the at least one transaction in comparison to what actually happened during the at least one transaction as indicated in the video data; and
constraining the visual recognition process to look for specific objects in the video data based on the transaction classification.

35. The method of claim 33 wherein processing the obtained video data includes:
examining the obtained video data to identify if a product associated with the purported transaction is present within the obtained video data, and if the product associated with the purported transaction is not present within the obtained video data, indicating that the purported transaction appears to be fraudulent.

36. A method for detecting a transaction outcome of a product transaction in a environment, the method comprising:
obtaining video data associated with a transaction area within which a purported transaction is indicated to have taken place within transaction data collected during the purported transaction; and
processing the obtained video data associated with the transaction area that is captured during a time of the purported transaction to produce the transaction outcome, wherein processing the obtained video data includes:
obtaining a transaction classification indicated by transaction data;
processing the video data to identify appropriate visual indicators within the video data that correspond to the transaction classification, wherein processing the video data to identify appropriate visual indicators comprises performing a visual recognition process based on the transaction classification that indicates what should have happened during the at least one transaction in comparison to what actually happened during the at least one transaction as indicated in the video data;
wherein processing the obtained video data includes:
obtaining transaction data associated with the purported transaction, the transaction data including a time at which the purported transaction takes place;
correlating the time at which the purported transaction takes place to a time in the obtained video to identify a segment of the obtained video data that would contain a confirmation image indicating if the purported transaction were fraudulent; and
digitally comparing the segment of the obtained video data to expected transaction video characteristics to determine if the segment of obtained video data substantially matches the expected transaction video characteristics to determine if the obtained video data indicates that the purported transaction appears to be fraudulent; and
wherein the transaction data includes an item identification and wherein the operation of digitally comparing the segment of the obtained video data to expected transaction video characteristics comprises:
based on the item identification, obtaining the expected transaction video characteristics from a library of expected transaction video data segments that correspond to item identifications, such that the expected transaction video characteristics used in the digital comparison corresponds to the item identification included in the transaction data.

37. A method for detecting a transaction outcome of a product transaction in a environment, the method comprising:

obtaining video data associated with a transaction area within which a purported transaction is indicated to have taken place within transaction data collected during the purported transaction; and processing the obtained video data associated with the transaction area that is captured during a time of the purported transaction to produce the transaction outcome, wherein processing the obtained video data includes:

obtaining a transaction classification indicated by transaction data;

processing the video data to identify appropriate visual indicators within the video data that correspond to the transaction classification, wherein processing the video data to identify appropriate visual indicators comprises performing a visual recognition process based on the transaction classification that indicates what should have happened during the at least one transaction in comparison to what actually happened during the at least one transaction as indicated in the video data;

wherein processing the obtained video data includes:

obtaining transaction data associated with the purported transaction, the transaction data including a time at which the purported transaction takes place;

correlating the time at which the purported transaction takes place to a time in the obtained video to identify a segment of the obtained video data that would contain a confirmation image indicating if the purported transaction were fraudulent; and digitally comparing the segment of the obtained video data to expected transaction video characteristics to determine if the segment of obtained video data substantially matches the expected transaction video characteristics to determine if the obtained video data indicates that the purported transaction appears to be fraudulent; and wherein correlating the time at which the purported retail transaction takes place to a time in the obtained video to identify a segment of the obtained video data that would contain a confirmation image indicating if the purported transaction were fraudulent comprises:

performing a time skew adjustment process to account for time differences that may be present between a time indicated within the obtained video data and a transaction time indicated in the transaction data.

* * * * *